United States Patent
Sakane et al.

(10) Patent No.: US 10,622,127 B2
(45) Date of Patent: *Apr. 14, 2020

(54) IRON-BASED OXIDE MAGNETIC PARTICLE POWDER, METHOD FOR PRODUCING SAME, COATING MATERIAL, AND MAGNETIC RECORDING MEDIUM

(71) Applicant: DOWA ELECTRONICS MATERIALS CO., LTD., Tokyo (JP)

(72) Inventors: Kenji Sakane, Tokyo (JP); Tetsuya Kawahito, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 333 days.

This patent is subject to a terminal disclaimer.

(21) Appl. No.: 15/541,505

(22) PCT Filed: Dec. 28, 2015

(86) PCT No.: PCT/JP2015/086484
§ 371 (c)(1),
(2) Date: Jul. 5, 2017

(87) PCT Pub. No.: WO2016/111224
PCT Pub. Date: Jul. 14, 2016

(65) Prior Publication Data
US 2018/0005737 A1    Jan. 4, 2018

(30) Foreign Application Priority Data

Jan. 9, 2015 (JP) ................................. 2015-002891
Apr. 28, 2015 (JP) ................................. 2015-092427

(51) Int. Cl.
| | | |
|---|---|---|
| H01F 1/03 | (2006.01) |
| G11B 5/712 | (2006.01) |
| C01G 49/02 | (2006.01) |
| C01G 49/00 | (2006.01) |
| G11B 5/706 | (2006.01) |
| B82Y 25/00 | (2011.01) |
| C01G 49/06 | (2006.01) |
| C01G 51/00 | (2006.01) |
| G11B 5/714 | (2006.01) |
| G11B 5/842 | (2006.01) |
| H01F 1/00 | (2006.01) |
| H01F 1/147 | (2006.01) |
| H01F 1/153 | (2006.01) |
| B82Y 30/00 | (2011.01) |
| B82Y 40/00 | (2011.01) |
| C01G 23/00 | (2006.01) |
| C01G 45/00 | (2006.01) |
| C01G 53/00 | (2006.01) |
| G01N 23/20 | (2018.01) |

(52) U.S. Cl.
CPC ............ H01F 1/0315 (2013.01); B82Y 25/00 (2013.01); C01G 49/0018 (2013.01); C01G 49/02 (2013.01); C01G 49/06 (2013.01); C01G 51/00 (2013.01); G11B 5/70642 (2013.01); G11B 5/712 (2013.01); G11B 5/714 (2013.01); G11B 5/842 (2013.01); H01F 1/0054 (2013.01); H01F 1/14725 (2013.01); H01F 1/15366 (2013.01); B82Y 30/00 (2013.01); B82Y 40/00 (2013.01); C01G 23/003 (2013.01); C01G 45/006 (2013.01); C01G 51/006 (2013.01); C01G 53/006 (2013.01); C01P 2002/52 (2013.01); C01P 2002/72 (2013.01); C01P 2004/04 (2013.01); C01P 2004/64 (2013.01); C01P 2006/42 (2013.01); G01N 23/20075 (2013.01)

(58) Field of Classification Search
CPC ... H10F 1/0315; B82Y 25/00; C01G 49/0018; C01G 49/02; C01G 49/06; C01G 49/0063; C01G 49/009; G11B 5/70642

See application file for complete search history.

(56) References Cited

FOREIGN PATENT DOCUMENTS

| | | |
|---|---|---|
| JP | 2008-174405 | 7/2008 |
| JP | 2009-206476 | 9/2009 |
| WO | 2007/114455 | 10/2007 |
| WO | 2008/029861 | 3/2008 |
| WO | 2008/149785 | 12/2008 |
| WO | 2012/101752 | 8/2012 |

*Primary Examiner* — C Melissa Koslow
(74) *Attorney, Agent, or Firm* — Clark & Brody

(57) ABSTRACT

An iron-based oxide magnetic particle powder has a narrow particle size distribution a small content of fine particles that do not contribute to magnetic recording characteristics, and a narrow coercive force distribution, to enhance magnetic recording medium density. Neutralizing an aqueous solution containing a trivalent iron ion and an ion of the metal substituting a part of the Fe sites by adding an alkali to make pH of 1.5 or more and 2.5 or less, adding a hydroxycarboxylic acid, and further neutralizing by adding an alkali to make pH of 8.0 or more and 9.0 or less are performed at 5° C. or more and 25° C. or less. A formed iron oxyhydroxide precipitate containing the substituting metal element is rinsed with water, then coated with silicon oxide, and then heated thereby providing e-type iron-based oxide magnetic particle powder. The rinsed precipitate may be subjected to a hydrothermal treatment.

12 Claims, 15 Drawing Sheets ized by the general formula $\varepsilon$-$A_xB_yFe_{2-x-y}O_3$ or $\varepsilon$-$A_xB_y$-# IRON-BASED OXIDE MAGNETIC PARTICLE POWDER, METHOD FOR PRODUCING SAME, COATING MATERIAL, AND MAGNETIC RECORDING MEDIUM

TECHNICAL FIELD

The present invention relates to an iron-based oxide magnetic particle powder that is suitable for a high density magnetic recording medium, a radio wave absorber, and the like, and particularly to particle powder having an average particle diameter of the particles in nanometer order, and a method for producing the same.

BACKGROUND ART

While $\varepsilon$-$Fe_2O_3$ is an extremely rare phase among iron oxides, particles thereof having a nanometer order size show a great coercive force (Hc) of approximately 20 kOe (1.59× $10^6$ A/m) at room temperature, and thus a production method for synthesizing $\varepsilon$-$Fe_2O_3$ as a single phase has been investigated (PTL 1). In the case where $\varepsilon$-$Fe_2O_3$ is used in a magnetic recording medium, there is no material in the current situation for a magnetic head having a high-level saturation magnetic flux density corresponding thereto, and thus the adjustment of the coercive force is performed by substituting a part of Fe sites of $\varepsilon$-$Fe_2O_3$ by a trivalent metal, such as Al, Ga, and In, and the relationship between the coercive force and the radio wave absorption characteristics is also investigated (PTL 2).

In the field of magnetic recording, development of a magnetic recording medium having a high carrier to noise ratio (C/N ratio) of the reproduced signal level and the particulate noise has been performed, and for increasing the recording density, the magnetic particles constituting the magnetic recording layer are demanded to be refined. However, the refinement of the magnetic particles generally tends to cause deterioration of the environmental stability and the thermal stability, which raises concerns about the deterioration of the magnetic characteristics of the magnetic particles under the use or storage environment, and accordingly, various partially substituted materials of $\varepsilon$-$Fe_2O_3$ represented by the general formula $\varepsilon$-$A_xB_yFe_{2-x-y}O_3$ or $\varepsilon$-$A_xB_y$-$C_zFe_{2-x-y-z}O_3$ (wherein A represents a divalent metal element, such as Co, Ni, Mn, and Zn; B represents a tetravalent metal atom, such as Ti; and C represents a trivalent metal element, such as In, Ga and Al) that have a reduced particle size and a variable coercive force and are excellent in environmental stability and thermal stability, by substituting a part of Fe sites of $\varepsilon$-$Fe_2O_3$ by another metal that is excellent in heat resistance have been developed (PTL 3).

$\varepsilon$-$Fe_2O_3$ is not a thermodynamically stable phase, and therefore the production thereof requires a special method. PTLs 1 to 3 shown above describe such a production method of $\varepsilon$-$Fe_2O_3$ that fine crystals of iron oxyhydroxide formed by a liquid phase method are used as a precursor, and the precursor is coated with a silicon oxide by a sol-gel method and then subjected to a heat treatment, and as the liquid phase method, a reverse micelle method using an organic solvent as the reaction medium, and a method using only an aqueous solution as the reaction medium are described respectively.

CITATION LIST

Patent Literatures

PTL 1: JP-A-2008-174405
PTL 2: WO 2008/029861
PTL 3: WO 2008/149785

SUMMARY OF INVENTION

Technical Problem

The $\varepsilon$-$Fe_2O_3$ and the $\varepsilon$-type iron-based oxide obtained by substituting a part of Fe produced by the ordinary methods described in PTLs 1 to 3 have excellent magnetic characteristics, but may cause fluctuation in the coercive force distribution observed in some cases depending on the production conditions. As a result of earnest investigations made by the present inventors, the inventors have found that the $\varepsilon$-$Fe_2O_3$ and the $\varepsilon$-type iron-based oxide obtained by substituting a part of Fe produced by the ordinary methods contain considerable amounts of particles that are extremely finer than the average particle diameter and have a small coercive force Hc, and particles of non-magnetic $\alpha$-$Fe_2O_3$ or the $\alpha$-type iron-based oxide obtained by substituting a part of Fe (both of which are hereinafter referred totally to as an $\alpha$-type iron-based oxide) as unavoidable impurities due to the production method. In the case where the iron-based oxide is used in a magnetic recording medium, these particles do not contribute to the enhancement of the recording density, and the content thereof is demanded to be decreased.

As a result of further investigations by the inventors, the inventors have found that the content of the low-Ho component, i.e., the former one, can be decreased in such a manner that in the production of iron oxyhydroxide or iron oxyhydroxide having a part of Fe substituted, which is used as the precursor of the $\varepsilon$-$Fe_2O_3$ or the $\varepsilon$-type iron-based oxide obtained by substituting a part of Fe, a hydroxycarboxylic acid is added to the aqueous solution containing Fe ion as a raw material, and the neutralization reaction is performed in two stages, and have applied as Japanese Patent Application No. 2014-193255. However, the $\alpha$-type iron-based oxide still remains even by using the production method, and thus there is a remaining problem that the content of the $\alpha$-type iron-based oxide particles is necessarily decreased, which constitute a heterogeneous phase (impurity) for the $\varepsilon$-$Fe_2O_3$ or the $\varepsilon$-type iron-based oxide obtained by substituting a part of Fe.

An object of the invention is to provide iron-based oxide magnetic particle powder that has a narrow particle size distribution, has a small content of fine particles as the low-Hc component, providing a narrow coercive force distribution, has a small content of non-magnetic $\alpha$-type iron-based oxide particles, and is suitable for the enhancement of the recording density of the magnetic recording medium.

Solution to Problem

The inventors have described in Japanese Patent Application No. 2014-193255 above that in the formation of the precursor of the $\varepsilon$-type iron-based oxide obtained by substituting a part of Fe sites of $\varepsilon$-$Fe_2O_3$ by another metal ion, when the neutralization reaction is performed in two stages to make the reaction through a hydroxide colloid of $Fe^{3+}$, the particle size distribution of the precursor particles can be narrowed, and the effect is enhanced by the presence of a hydroxycarboxylic acid, which stabilizes the hydroxide colloid, thereby finally decreasing the content of the low-Hc component. The inventors have also described that when the precursor contains iron oxyhydroxide having the same crystal structure as ferrihydrite ($Fe_5O_7(OH) \cdot 4H_2O$), or a compound obtained by substituting a part of Fe element thereof, the coercive force distribution of the iron-based oxide magnetic particle powder finally obtained can be narrowed. As a result of further investigation made by the inventors, it has been found that when the formation reaction of the precursor is performed at 25° C. or less, the content of the α-type iron-based oxide particles can be decreased.

The inventors have completed the invention described below based on the aforementioned knowledge.

The composition of ferrihydrite shown in parentheses is the ideal one, and the composition thereof actually has a certain fluctuation.

For solving the problems, the invention provides an iron-based oxide magnetic particle powder comprising ε-$Fe_2O_3$ having an average particle diameter measured with a transmission electron microscope of 10 nm or more and 30 nm or less, a part of Fe sites of which is substituted by another metal element, the magnetic particle powder having a value of $I_L/I_H$ defined below of 0.7 or less and a value of $α_s/ε_s$ defined below of 0.1 or less, wherein $I_H$ represents an intensity of a peak present on a high magnetic field side in a differential B-H curve obtained by numerical differentiation of a B-H curve obtained by measuring under conditions of an applied magnetic field of 1,035 kA/m (13 kOe), an M measurement range of 0.005 A·m² (5 emu), a step bit of 80 bit, a time constant of 0.03 sec, and a wait time of 0.1 sec; and $I_L$ represents an intensity of an intercept of an ordinate at zero magnetic field in the differential B-H curve, and $α_s$ represents a maximum value of a diffraction intensity except for background in X-ray diffractometry at 2θ of 27.2° or more and 29.7° or less; and $ε_s$ represents a maximum value of a diffraction intensity except for background in X-ray diffractometry at 2θ of 42° or more and 44° or less.

The iron-based oxide is preferably ε-$A_xB_yC_zF_{2-x-y-z}O_3$ (wherein A represents at least one divalent metal element selected from Co, Ni, Mn, and Zn; B represents at least one tetravalent metal atom selected from Ti and Sn; C represents at least one trivalent metal element selected from In, Ga, and Al; and 0<x, y, z<1).

The invention also provides a method for producing an iron-based oxide magnetic particle powder comprising ε-$Fe_2O_3$ having an average particle diameter measured with a transmission electron microscope of 10 nm or more and 30 nm or less, apart of Fe sites of which is substituted by another metal element, the iron-based oxide magnetic particle powder preferably having the value of $I_L/I_H$ of 0.7 or less and the value of $α_s/ε_s$ of 0.1 or less, the method containing: using an aqueous solution containing a trivalent iron ion and an ion of the metal substituting a part of the Fe sites as starting substances; neutralizing the aqueous solution by adding an alkali thereto to make pH of 1.5 or more and 2.5 or less at a temperature retained at 5° C. or more and 25° C. or less; then adding a hydroxycarboxylic acid, preferably one or both of tartaric acid and citric acid, to the aqueous solution at a temperature retained at 5° C. or more and 25° C. or less; neutralizing the aqueous solution by further adding an alkali thereto to make pH of 8.0 or more and 9.0 or less at a temperature retained at 5° C. or more and 25° C. or less; rinsing a formed precipitate of iron oxyhydroxide containing the substituting metal element with water; then coating a silicon oxide on the iron oxyhydroxide containing the substituting element; and heating to provide an iron oxide containing the substituting metal element coated with the silicon oxide.

The invention also provides the production method, in which the iron oxyhydroxide containing the substituting metal element after rinsed with water is subjected to a hydrothermal treatment at 120° C. or more and 180° C. or less.

The invention also provides the production method, in which the silicon oxide coated the iron oxide containing the substituting metal element obtained by the production method is removed, and thereby the iron-based oxide magnetic particle powder suitable for increasing the recording density of the magnetic recording medium since the component that does not contribute to magnetic recording is decreased. In the case where classification is performed, it is necessarily performed as a pre-treatment thereof, and the classification may narrow the particle size distribution and the coercive force distribution, thereby further enhancing the magnetic recording characteristics of the resulting iron-based oxide magnetic particle powder.

The iron-based oxide magnetic particle powder of the invention includes all kinds of iron-based oxide magnetic particle powder produced by the aforementioned production methods.

The iron-based oxide magnetic particle powder produced by the invention may contain, as magnetic particles, ε-$A_xB_yC_zFe_{2-x-y-z}O_3$ (wherein A represents at least one divalent metal element selected from Co, Ni, Mn, and Zn; B represents at least one tetravalent metal atom selected from Ti and Sn; C represents at least one trivalent metal element selected from In, Ga, and Al; and 0<x, y, z<1).

The iron-based oxide magnetic particle powder obtained by the invention may be formed into a coating material for a coating type magnetic recording medium, by kneading with an organic solvent and other additives.

A coating type magnetic recording medium may be obtained by using the coating material containing the iron-based oxide magnetic particle powder.

Advantageous Effects of Invention

By using the production method of the invention, an iron-based oxide magnetic particle powder can be provided that has a narrow particle size distribution, has a small content of particles that do not contribute to the enhancement of the magnetic recording characteristics, providing a narrow coercive force distribution, and is suitable for the enhancement of the recording density of the magnetic recording medium.

DESCRIPTION OF EMBODIMENTS

Iron-Based Oxide Magnetic Particles

Figure 1:
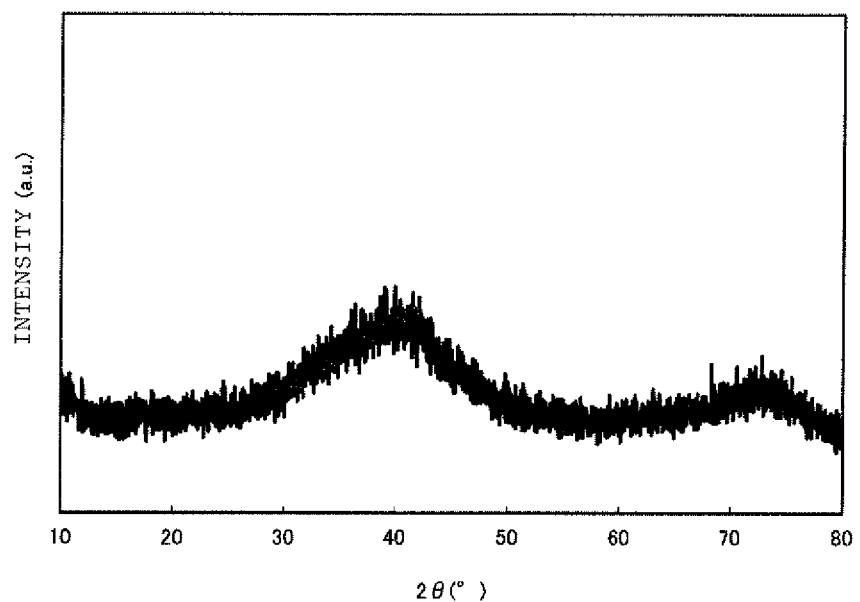
FIG. 1 shows the X-ray diffraction pattern of the iron oxyhydroxide crystals containing substituting elements obtained in Example 1.

The production method of the invention is to produce an iron-based oxide magnetic particle powder comprising $\varepsilon\text{-Fe}_2\text{O}_3$, a part of Fe sites of which is substituted by another metal element, and the magnetic particle powder contains a heterogeneous phase (which mainly contains an $\alpha$-type iron-based oxide) as unavoidable impurities due to the production method thereof. An object of the invention is to decrease the content of the heterogeneous phase.

The presence of an $\varepsilon$-structure in the partially substituted material obtained by substituting a part of Fe sites of $\varepsilon\text{-Fe}_2\text{O}_3$ by another metal element can be confirmed by using X-ray diffractometry (XRD), high energy electron diffractometry (HEED), and the like.

Examples of the partially substituted materials capable of being produced by the production method of the invention include the following.

Material represented by the general formula $\varepsilon\text{-C}_z\text{Fe}_{2-z}\text{O}_3$ (wherein C represents at least one trivalent metal element selected from In, Ga, and Al)

Material represented by the general formula $\varepsilon\text{-A}_x\text{B}_y\text{Fe}_{2-x-y}\text{O}_3$ (wherein A represents at least one divalent metal element selected from Co, Ni, Mn, and Zn; and B represents at least one tetravalent metal element selected from Ti and Sn)

Material represented by the general formula $\varepsilon\text{-A}_x\text{C}_z\text{Fe}_{2-x-z}\text{O}_3$ (wherein A represents at least one divalent metal element selected from Co, Ni, Mn, and Zn; and C represents at least one trivalent metal element selected from In, Ga, and Al)

Material represented by the general formula $\varepsilon\text{-B}_y\text{C}_z\text{Fe}_{2-y-z}\text{O}_3$ (wherein B represents at least one tetravalent metal element selected from Ti and Sn; and C represents at least one trivalent metal element selected from In, Ga, and Al)

Material represented by the general formula $\varepsilon\text{-A}_x\text{B}_y\text{C}_z\text{Fe}_{2-x-y-z}\text{O}_3$ (wherein A represents at least one divalent metal element selected from Co, Ni, Mn, and Zn; B represents at least one tetravalent metal element selected from Ti and Sn; and C represents at least one trivalent metal element selected from In, Ga, and Al)

The material of the type that is substituted by the C element can be arbitrarily controlled for the coercive force of the magnetic particles, and also has an advantage that the same space group as $\varepsilon\text{-Fe}_2\text{O}_3$, but is slightly inferior in thermal stability, and therefore the material is preferably substituted simultaneously by the A or B element.

The material of the three-element substituted type that is substituted by the three elements A, B, and C is best balanced among the aforementioned characteristics, and is excellent in heat resistance, easiness in providing a single phase, and controllability of the coercive force. In the description herein, the three-element substituted material will be mainly described hereinafter. The production method of the invention can be applied to the iron-based oxide magnetic particles of all the substitution types.

In the three-element substituted material, the preferred ranges of the substituting amounts x, y, and z are as follows.

x and y may be in arbitrary ranges in $0<x$, $y<1$, and is preferably in ranges of $0.01 \leq x$ and $y \leq 0.2$ since the coercive force of the three-element substituted material is necessarily changed from that of $\varepsilon\text{-Fe}_2\text{O}_3$ in consideration of the application to magnetic recording. z may also be in a range of $0<z<1$, and is preferably in a range of $0<z\leq0.5$ from the standpoint of the control of the coercive force and the easiness in providing a single phase.

The magnetic particles having a part of Fe sites substituted obtained by the production method of the invention can retain a high coercive force at ordinary temperature by suitably controlling the values x and y, and the coercive force can be controlled to a desired value by controlling x, y, and z.

Average Particle Diameter

The magnetic particles obtained by the production method of the invention are preferably fine to such an extent that the particles each form a single magnetic domain structure. Specifically, the average particle diameter measured with a transmission electron microscope is preferably 30 nm or less, and more preferably 20 nm or less. However, when the average particle diameter is too small, the proportion of fine particles that do not contribute to the aforementioned enhancement of the magnetic characteristics may be increased to deteriorate the magnetic characteristics per unit weight of the magnetic particles, and thus the average particle diameter is preferably 10 nm or more.

Starting Substance and Precursor

In the production method of the invention, as a starting substance of the iron-based oxide magnetic particle powder, an acidic aqueous solution containing a trivalent iron ion and an ion of a metal that finally substituting the Fe sites (which may be hereinafter referred to as a raw material solution). The supply sources of the iron ion and the metal ion of the substituting element each are preferably a water soluble inorganic salt, such as a nitrate, a sulfate, and a chloride, from the standpoint of the availability and the cost. When the metal salt is dissolved in water, the metal ion is dissociated, and the aqueous solution exhibits acidity. When an alkali is added to the acidic aqueous solution containing the metal ions for neutralization, a mixture of iron oxyhydroxide and an oxyhydroxide of the substituting element, or iron oxyhydroxide, a part of Fe sites of which is substituted by another metal element, is obtained. In the production method of the invention, the mixture of iron oxyhydroxide and an oxyhydroxide of the substituting element is used as a precursor of the iron-based oxide magnetic particle powder.

The total metal ion concentration in the raw material solution is not particularly determined in the invention, and may be, for example, 0.01 mol/L or more and 0.5 mol/L or less. When the total metal ion concentration in the raw material solution is too small, the amount of the iron-based oxide magnetic particle powder that is obtained by one time of the reaction may be decreased, which is economically disadvantageous. When the total metal ion concentration in the raw material solution is too large, the reaction solution tends to be gelled due to the rapid formation of the precipitate of the hydroxide.

In general, it has been known that the crystal structure of iron oxyhydroxide formed through a liquid phase method varies depending on the anion species present in the aqueous solution and the neutralization condition. As a result of the investigations by the inventors, it has been found that an ε-type iron-based oxide tends to be obtained finally in the case where iron oxyhydroxide as the precursor of the iron-based oxide magnetic particle powder contains one having a ferrihydrite structure.

The reason why an ε-type iron-based oxide tends to be obtained when the production thereof is performed through the oxyhydroxide having a ferrihydrite structure is not clear under the current situation, and it is expected that ferrihydrite has a structure having many defects, in which layers having a hexagonal closest packing arrangement and a cubic hexagonal closest packing arrangement of $O^{2-}$ and $OH^-$ are irregularly laminated, lacking a part of the Fe octahedron, and in the case where the structure is subjected to a heat treatment under the constrained condition with a silicon oxide covering the structure, the structure tends to be converted to the ε-type iron-based oxide. It is also expected that in the case where another metal element other than Fe is added for substituting a part of Fe sites of $\varepsilon\text{-Fe}_2O_3$ by the metal element, coprecipitation with Fe is liable to occur, and a heterogeneous phase other than ferrihydrite is difficult to be formed, which are preferred from the standpoint of the compositional uniformity and the particle uniformity.

Ferrihydrite includes two structures referred to as 6-line (6L) and 2-line (2L), and ferrihydrite having a 2L structure tends to be converted to the ε-type iron-based oxide, as compared to ferrihydrite having a 6L structure.

First Neutralization Step

In the production method of the invention, an alkali is added to the raw material solution to neutralize the solution until the pH thereof becomes 1.5 or more and 2.5 or less. The alkali used for neutralization may be any of a hydroxide of an alkali metal or an alkaline earth metal, aqueous ammonia, and an ammonium salt, such as ammonium hydrogen carbonate, and aqueous ammonia and ammonium hydrogen carbonate are preferably used since these compounds are difficult to form finally an impurity after the formation of the ε-type iron-based oxide through the heat treatment. The alkali may be added in the form of a solid to the aqueous solution of the starting substances, and is preferably added in the form of an aqueous solution thereto from the standpoint of ensuring the uniformity of the reaction.

When the alkali is added to the raw material solution to increase the pH to the aforementioned range, a precipitate of a hydroxide of trivalent iron is precipitated, and during the neutralization treatment, the reaction solution is stirred with a known mechanical measure. Since the formation of the precipitate is in a sort of an overshoot state, the precipitate is deflocculated by retaining the pH under stirring the reaction solution, and then the reaction solution becomes clear. While the period of time required for the retention varies depending on the metal ion concentration of the raw material solution and the addition rate of the alkali, the reaction solution is retained until the solution becomes a clear state. In this state, a part of iron in the reaction solution forms a hydroxide colloid, whereas the balance thereof is dissolved as a soluble iron ion, and it is expected that the hydroxide colloid of iron becomes nuclei of the formation of the precursor in the second neutralization step.

In the production method of the invention, it is considered that the iron-based oxide magnetic particle powder having a narrow average particle diameter distribution is obtained since the dispersibility of the hydroxide colloid of iron formed in this step is better than that of the precipitate of the hydroxide before the deflocculation.

In this step, the pH of less than 1.5 after the neutralization is not preferred since the hydroxide colloid of iron may be further dissolved as a soluble iron ion. The pH exceeding 2.5 after the neutralization is also not preferred since the precipitate of the hydroxide of iron tends to remain.

In the production method of the invention, the temperature in the neutralization treatment is 5° C. or more and 25° C. or less. The temperature less than 5° C. is not preferred since the period of time required for the redissolution of the hydroxide precipitate may be prolonged. The temperature exceeding 25° C. is not preferred since an α-type oxide as a heterogeneous phase tends to be formed finally. The reason why the α-type oxide tends to be formed is not clear under the current situation, and it is expected that a part of the ferrihydrite structure is changed.

When the neutralization reaction is performed in the first and second neutralization steps, neutralization heat is generated, and the temperature of the reaction solution is increased. When the temperature of the reaction solution exceeds 26° C., an α-type oxide can be prevented from being formed by cooling the reaction solution to 25° C. or less within 5 minutes.

The values of pH described in the description herein are measured according to JIS Z8802 with a glass electrode. The pH standard solution refers to the value that is measured with a pH meter calibrated with the suitable buffer solution corresponding to the pH range to be measured. The values of pH described in the description herein each are a value shown by the pH meter compensated with a temperature compensation electrode that is directly read under the reaction temperature condition.

Step of Adding Hydroxycarboxylic Acid

In the production method of the invention, a hydroxycarboxylic acid is subsequently added to the reaction solution that has been clear by retaining after neutralizing the raw material solution. A hydroxycarboxylic acid is a carboxylic acid that has an OH group in the molecule thereof, and functions as a complexing agent for iron ion. It is considered that the hydroxycarboxylic acid herein has such an effect that the hydroxycarboxylic acid forms a complex with the trivalent iron ion dissolved in the reaction solution, so as to retard the formation reaction of a hydroxide of iron in the second neutralization treatment in the next step, and consequently the distribution of the average particle diameter of the fine particles of the precursor of the iron oxyhydroxide thus formed is narrowed.

A hydroxycarboxylic acid includes various kinds, such as glycolic acid, lactic acid, various hydroxybutyric acids, glyceric acid, malic acid, tartaric acid, citric acid, and mevalonic acid, and a polybasic aliphatic hydroxycarboxylic acid is preferred from the standpoint of the complexing capability, and tartaric acid, citric acid, and malic acid are more preferred from the standpoint of the cost and the availability.

The amount of the hydroxycarboxylic acid is preferably 0.01 or more and 0.5 or less in terms of molar ratio based on the amount of the trivalent iron ion contained in the reaction solution. When the molar ratio is less than 0.01, the effect of the addition of the hydroxycarboxylic acid may not be obtained, and when the molar ratio exceeds 0.5, the effect of retarding the formation reaction of a hydroxide may become excessive, both of which are not preferred. It is expected that the hydroxycarboxylic acid also has such a function that the hydroxycarboxylic acid is adsorbed on the surface of the hydroxide colloid of iron in the reaction solution, so as to stabilize the dispersion of the hydroxide colloid.

The hydroxycarboxylic acid may be added under the mechanical stirring state retained, without change in reaction temperature from the first neutralization step as the preceding step. The hydroxycarboxylic acid may be added in the form of solid to the reaction solution, and is preferably added thereto in the form of an aqueous solution from the standpoint of ensuring the uniformity of the reaction.

Second Neutralization Step

In the production method of the invention, an alkali is further added to the reaction solution after the addition of the hydroxycarboxylic acid, so as to neutralize the solution until the pH thereof becomes 8.0 or more and 9.0 or less. The alkali to be added may be the same as in the first neutralization step. Through this step, the nuclei of the iron oxyhydroxide as the precursor of the ε-type iron-based oxide, formed in the first neutralization step are grown to form final precursor crystals.

In this step, by the addition of the alkali, the trivalent iron ion present in the reaction solution is reacted with $OH^-$ ion to form the iron oxyhydroxide, and at this time, it is considered that the hydroxide colloid of iron excellent in dispersibility functions as nuclei of precipitation, which prevents heterogeneous growth of the iron oxyhydroxide containing the substituting element depending on the reaction sites, and consequently the precursor having a narrow distribution of the average particle diameter can be obtained. It is also considered that the trivalent iron ion present in the reaction solution gradually undergoes the reaction with $OH^-$ ion since the trivalent iron ion forms the complex with hydroxycarboxylic acid, and thus heterogeneous growth in size can be prevented among the iron oxyhydroxide particles containing the substituting element to be grown.

The reason why ferrihydrite tends to be formed as the iron oxyhydroxide containing the substituting element as the precursor in the production method of the invention is not clear under the current situation, and it is considered that the contribution is made by two factors that the iron hydroxide colloid functions as the formation nuclei, and the formation is performed through the reaction of substituting hydroxycarboxylic acid coordinated to the trivalent iron ion by $OH^-$ ion.

In this step, the pH after the neutralization that is less than 7.5 is not preferred since Co that has not completely been neutralized in the first neutralization step may remain as ion in the solution, so as to cause deviation of the composition, and waste of Co, which is economically disadvantageous. The pH exceeding 9.0 is also not preferred since the effect of the neutralization may be saturated.

In the production method of the invention, the reaction temperature in the neutralization treatment is 5° C. or more and 25° C. or less.

When the neutralization reaction is performed, neutralization heat is generated, and the temperature of the reaction solution is increased. When the temperature of the reaction solution exceeds 25° C., an α-phase can be prevented from being formed by cooling the reaction solution to 25° C. or less within 5 minutes.

The reaction condition is preferably controlled to make a reaction time of 60 minutes or more and 480 minutes or less, taking the balance between the growth rate of the iron oxyhydroxide and the economic efficiency.

Water Rinsing Step

In the production method of the invention, the iron oxyhydroxide as the precursor formed through the aforementioned steps has an increasing ion intensity in the solution through the step of adding a hydroxycarboxylic acid and the second neutralization step, resulting in an aggregating system, which is not preferred. Accordingly, the slurry obtained through the steps is rinsed with water to decrease the ion intensity, so as to make a dispersed state again. The method of rinsing with water is not particularly determined herein, and a method of subjecting the slurry as it is to a water rinsing treatment is preferred in consideration of the retention of the particle dispersibility, the uniformity in rinsing, the smooth transition to the preceding and subsequent steps, the handleability, and the like. Taking these factors into consideration, the water rinsing step is preferably performed with an ultrafiltration membrane or an ion exchange membrane. In the rinsing with an ultrafiltration membrane, the membrane used may have a cut-off molecular weight that prevents the particles from going into the filtrate, and the rinsing is preferably terminated at the time when the electroconductivity of the filtrate reaches 50 mS/m or less, and more preferably 10 mS/m or less. When the amount of the residual ion is too large, there may be a problem described later that a low-Hc component tends to be formed.

Hydrothermal Treatment

In the production method of the invention, the iron oxyhydroxide containing the substituting element after rinsing water may be subjected to a hydrothermal treatment. The hydrothermal treatment performed may decrease and improve the value of $I_L/I_H$ and the SFD (switching field distribution) described later of the iron-based oxide magnetic particle powder finally obtained. It is considered that this is because a phenomenon like Ostwald ripening, i.e., dissolution and reprecipitation of the iron oxyhydroxide crystals containing the substituting element, occurs in the hydrothermal treatment, whereby the crystallinity of the precursor is improved, and the composition is further uniformized.

The hydrothermal treatment may be performed at a temperature of 120° C. or more and 180° C. or less with a sealed vessel, such as an autoclave. When the hydrothermal treatment temperature is less than 120° C., the effect of the treatment may be small, and when the temperature exceeds 180° C., a precursor that does not become an ε-type iron oxide may be formed, both of which are not preferred. The solution applied to the hydrothermal treatment may be the slurry after the water rinsing untouched with no material added, i.e., pure water, and may be a solution having pH adjusted to 9 or less at ordinary temperature by adding an alkali. In the production method of the invention, the period of time for the hydrothermal treatment is not particularly determined, and may be, for example, 1.0 hours or more, by which a sufficient effect may be obtained.

Step of Coating Silicon Oxide

In the production method of the invention, the iron oxyhydroxide containing the substituting element as the precursor formed in the preceding steps is difficult to undergo phase transition to the ε-type iron-based oxide even though the iron oxyhydroxide is subjected to a heat treatment, and therefore the iron oxyhydroxide containing the substituting element is subjected to a silicon oxide coating before the heat treatment. The coating method of a silicon oxide is preferably a sol-gel method. The silicon oxide referred herein include not only ones having the stoichiometric composition, but also ones having nonstoichiometric compositions, such as a silanol derivative described later.

In the sol-gel method, a silicon compound having a hydrolyzable group, for example, a silane compound, such as tetraethoxysilane (TEOS), tetramethoxysilane (TMOS), and various silane coupling agents, is added to the aqueous solution of the iron oxyhydroxide crystals containing the substituting element having been dispersed by the water rinsing, and stirred to cause hydrolysis reaction, and a silanol derivative thus formed is coated on the surface of the iron oxyhydroxide crystals. An acid catalyst or an alkali catalyst may be added, and is preferably added in consideration of the treatment time. Representative examples thereof include hydrochloric acid for the acid catalyst, and ammonia for the alkali catalyst. In the case where the acid catalyst is used, the amount thereof may be such an amount at most that does not dissolve the iron oxyhydroxide particles containing the substituting element. In addition, sodium silicate (liquid glass) as an inorganic silicon compound may also be used.

The specific procedure of the coating of the silicon oxide may be the same as the sol-gel method in the known process. For example, the reaction temperature for the silicon oxide coating by the sol-gel method may be 20° C. or more and 60° C. or less, and the reaction time therefor may be 1 hour or more and 20 hours or less. After coating the silicon oxide, the material may be subjected to rinsing, solid-liquid separation, and drying, so as to provide a specimen before the heat treatment. In the solid-liquid separation herein, solid-liquid separation may be performed with an aggregating agent added.

Heat Treatment

In the production method of the invention, the iron oxyhydroxide containing the substituting element as the precursor coated with the silicon oxide is heat-treated to provide the ε-type iron-based oxide. Before the heat treatment, steps of rinsing and drying may be performed. The heat treatment may be performed in an oxidizing atmosphere, and the oxidizing atmosphere may be the air atmosphere. The heating may be performed in a range approximately of 700° C. or more and 1,300° C. or less, and when the heating temperature is too high, $\alpha$-$Fe_2O_3$ as a thermodynamically stable phase (which is an impurity to ε-$Fe_2O_3$) tends to be formed, the heat treatment is preferably performed at 900° C. or more and 1,200° C. or less, and more preferably 950° C. or more and 1,150° C. or less. The heat treatment time may be controlled to a range approximately of 0.5 hour or more and 10 hours or less, and a favorable result tends to be obtained in a range of 2 hours or more and 5 hours or less. It is considered that the presence of the silicon-containing substance covering the particles advantageously affects the phase transition to the ε-type iron-based oxide, but not to the phase transition to the α-type iron-based oxide. The silicon oxide coating also has a function of preventing the iron oxyhydroxide crystals containing the substituting element from being sintered in the heat treatment.

Through the process steps described above, the partially substituted ε-$Fe_2O_3$ crystals are obtained in the form coated with the silicon oxide in the case where the raw material solution contains trivalent iron ion and the metal element for substituting Fe sites as metal ions. The powder obtained after the heat treatment contains, in addition to the ε-type iron-based oxide, an α-type iron-based oxide, a γ-type iron-based oxide, and $Fe_3O_4$ crystals as impurities in some cases, and these materials are referred totally as the iron-based oxide magnetic particle powder.

The iron-based oxide magnetic particle powder obtained by the production method of the invention may be used in the form coated with the silicon oxide, and depending on purposes, may be used in a state where the silicon oxide coated on the surface is removed by the step shown below.

Step of Removing Silicon Oxide Coating

In the case where the coating of the silicon oxide is not necessary for the iron-based oxide magnetic particle powder, or in the case where the iron-based oxide magnetic particle powder is to be classified for enhancing the magnetic recording characteristics, the silicon oxide coated on the ε-$Fe_2O_3$ crystals may be removed in advance. For the purpose of a coating type magnetic recording medium, magnetic particles coated on a tape are necessarily subjected to a magnetic field orientation treatment, and the state where the silicon oxide is coated has decreased magnetization per unit area of a tape (a signal from the tape is decreased) due to the presence of the silicon oxide as a non-magnetic component. Accordingly, the silicon oxide coated is preferably removed by the step described below. As a specific method, the silicon oxide may be dissolved and removed by immersing and stirring the powder after the heat treatment in an aqueous solution containing a strong alkali, such as NaOH and KOH, since the silicon oxide is soluble in an alkaline aqueous solution. In the case where the dissolution rate is to be increased, the alkaline aqueous solution may be heated. As a representative example, the silicon oxide may be favorably dissolved by stirring the powder in a state, in which an alkali, such as NaOH, is added in an amount 3 times by mol or more the silicon oxide, and the temperature of the aqueous solution is 60° C. or more and 70° C. or less. The extent of the removal of the silicon oxide coating may be controlled depending on purposes.

After the removal, unnecessary ion is necessarily rinsed out with water until the electroconductivity of the filtrate reaches 50 mS/m or less for ensuring the good dispersibility in the subsequent step.

Classification Step

In the production method of the invention, an iron-based oxide magnetic particle powder that is suitable for the purpose of a coating type magnetic recording medium can be obtained without a classification step, and an iron-based oxide magnetic particle powder that is further suitable for high density recording can be obtained by performing a classification treatment. In the micrograph with a transmission electron microscope (TEM) of the particles that are not subjected to classification, the presence of a slight amount of particles that do not contribute to magnetic recording is observed, such as fine particles, which are inferior in stability in environmental resistance (thermal stability) and are considered to have weak magnetization, and coarse particles, which are considered to have a coercive force larger than a saturation magnetic flux density of a magnetic head.

As a specific procedure, a dispersion treatment is performed firstly. The slurry after completing the step of removing the silicon oxide coating is in an aggregating system, and in the case where the slurry untouched is subjected to classification, the coarse particles are removed along with the fine particles, and the fine particles are processed along with the coarse particles, due to the poor classification efficiency. The yield may be decreased, providing a poor economic efficiency. The dispersion treatment may be a treatment combining pH control and a dispersion device, in which the pH of the dispersion is controlled to 10 or more and 11 or less by adding an alkali thereto, and then the slurry is dispersed with an ultrasonic dispersion device or the like, thereby changing the turbid aggregated slurry to a dispersed slurry having transparency.

The dispersed slurry is then subjected to a known classification treatment. In the case of classification by centrifugal separation, the target classification point is set by the rotation number, the time, and the like, for removing the particles that do not contribute to magnetic recording.

In the iron-based oxide magnetic particle powder thus obtained, the proportion of the particles that contribute to magnetic recording is increased, so as to provide the iron-based oxide magnetic particle powder that is further suitable for high density recording.

Observation with Transmission Electron Microscope (TEM)

The observation of the iron-based oxide magnetic particle powder obtained by the production method of the invention with a TEM is performed under the following condition.

The TEM used for observation is JEM-1011, produced by JEOL, Ltd. For the observation of particles, micrographs are taken at a magnification of 10,000 and 100,000, and enlarged by 3 times on developing, and the resulting TEM micrographs are used (using the particles after removing the silicon oxide coating).

The average particle diameter and the evaluation of the particle size distribution (i.e., the coefficient of variation (%) and the number of particles having a particle diameter of 8 nm or less (%)) are measured by digitizing, in which the distance between two points in one particle that are most remote from each other is measured. The number of particles measured is 300 or more.

Measurement of X-ray Diffraction (XRD) Pattern

The resulting specimen is subjected to powder X-ray diffraction (XRD, RINT 2000, produced by Rigaku Corporation, radiation source: CoKα, voltage: 40 kV, current: 30 mA, 2θ=10° or more and 80° or less). By the measurement, the precursor phase, the formation of the ε-phase, and the heterogeneous phase are confirmed.

The values $\alpha_s$ and $\varepsilon_s$ are obtained in the following manner, and the ratio of the resulting peak heights $\alpha_s/\varepsilon_s$ is obtained from the resulting values.

The value $\alpha_s$ is the maximum value of the diffraction intensity except for the background in the X-ray diffractiometry performed at 2θ of 27.2° or more and 29.7° or less (i.e., the position of the diffraction peak of the α-phase that does not overlap the diffraction peak of the ε-phase) and the value $\varepsilon_s$ is the maximum value of the diffraction intensity except for the background in the X-ray diffractiometry performed at 2θ of 42° or more and 44° or less (i.e., the position of the diffraction peak of the ε-phase that does not overlap the diffraction peak of the α-phase). For calculating the background, the average value of the diffraction intensity at 27.1° or more and 27.2° or less and 29.7° or more and 29.8° or less is used for 27.2° or more and 29.7° or less, and the average value of the diffraction intensity at 39.9° or more and 40.0° or less and 44.0° or more and 44.1° or less is used for 42° or more and 44° or less. The ratio of the resulting peak heights $\alpha_s/\varepsilon_s$ is obtained from these values.

$\alpha_s$=(maximum value of X-ray diffraction intensity at 27.2° or more and 29.7° or less)−(average value of diffraction intensity at 27.1° or more and 27.2° or less and 29.7° or more and 29.8° or less)

$\varepsilon_s$=(maximum value of X-ray diffraction intensity at 42° or more and 44° or less)−(average value of X-ray diffraction intensity at 39.9° or more and 40.0° or less and 44.0° or more and 44.1° or less)

In consideration of the use of the iron-based oxide magnetic particle powder in a magnetic recording medium, the nonmagnetic α-type oxide is an impurity that does not contribute to magnetic recording, and therefore when the value of the ratio of the resulting peak heights $\alpha_s/\varepsilon_s$ is smaller, the amount of the particles that do not contribute to magnetic recording is decreased to increase the recording density. According to the production method of the invention, the iron-based oxide magnetic particle powder that has a value of $\alpha_s/\varepsilon_s$ of 0.1 or less can be obtained.

Compositional Analysis by High-Frequency Inductively Coupled Plasma (ICP) Atomic Emission Spectroscopy The compositional analysis is performed with ICP-720ES, produced by Agilent Technologies, Inc. The measurement wavelengths (nm) are Fe: 259.940 nm, Ga: 294.363 nm, Co: 230.786 nm, Ti: 336.122 nm, and Si: 288.158 nm.

Measurement of Magnetic Hysteresis Curve (Bulk B-H Curve)

The magnetic characteristics are measured with a vibrating sample magnetometer VSM (VSM-5, produced by Toei Industry Co., Ltd.) an applied magnetic field of 1,035 kA/m (13 kOe), an M measurement range of 0.005 A·m² (5 emu), a step bit of 80 bit, a time constant of 0.03 sec, and a wait time of 0.1 sec. The coercive force Hc, the saturation magnetization σs, and SFD are evaluated by the B-H curve, and the low-Hc component that does not contribute to magnetic recording is evaluated by the differential B-H curve. For the numerical differentiation, the moving average of 8 plots is used. In the measurements and evaluation herein, the attached software, produced by Toei Industry Co., Ltd., (ver. 2.1) is used.

In the description herein, the differential B-H curve is calculated in addition to the ordinary magnetic characteristics, and thereby the magnetic characteristics of the resulting iron-based oxide magnetic particle powder are analyzed in more detail. The specific analysis method will be described below (see FIG. 6(b) shown later).

In the measurement of the B-H curve of the iron-based oxide magnetic particle powder comprising the partially substituted ε-Fe₂O₃ produced by the liquid phase method, when the external magnetic field is increased after completing the demagnetization, a small shoulder (depression) is present in the increase curve of the magnetic flux density around the zero magnetic field. Accordingly, two peaks are observed in the differential B-H curve obtained by numerical differentiation of the B-H curve. This means that the B-H curve measured for the iron-based oxide magnetic particle powder is a result of synthesis of two B-H curves with different coercive forces Hc, and the iron-based oxide magnetic particle powder contains two components with different magnetic characteristics.

The component on the low Hc side is a component that does not contribute to the enhancement of the recording density in the use of the iron-based oxide magnetic particle powder in a magnetic recording medium. In the case where the abundance ratio of the extremely finer particles than the average particle diameter contained in the iron-based oxide magnetic particle powder is decreased by such a measure as the change of the production condition, and the classification, the height of the peak on the low Hc side in the differential B-H curve is decreased, from which it is understood that the fine particles are the low-Hc component.

In consideration of the use of the iron-based oxide magnetic particle powder in a magnetic recording medium, when the ratio of the peak heights $I_L/I_H$ is smaller, the amount of the particles that do not contribute to magnetic recording is decreased, and thus the recording density is increased, in which $I_L$ represents the intensity of the intercept of the ordinate at zero magnetic field in the differential B-H curve, and $I_H$ represents the peak height on the high Hc side therein. According to the production method of the invention, the iron-based oxide magnetic particle powder that has a value of $I_L/I_H$ of 0.7 or less can be obtained.

The value obtained by dividing the half bandwidth of the peak on the high Hc side by Hc is a value corresponding to SFD (switching field distribution), and when the half bandwidth is smaller, the coercive force distribution of the iron-based oxide magnetic particle powder is narrower. According to the production method of the invention, the iron-based oxide magnetic particle powder that has a smaller half bandwidth of the peak on the high Hc side than the ordinary production method, and has SFD of 1.00 or less can be obtained.

Preparation of Magnetic Coating Material 0.31 g of a sample powder (surface-modified iron-based oxide magnetic particle powder) is weighed and placed in a stainless steel pot (inner diameter: 45 mm, depth: 13 mm), which is allowed to be in a state where the lid thereof is opened for 10 minutes. A vehicle (obtained by dissolving 34.9 g of a urethane resin (UR-8200, produced by Toyobo Co., Ltd.) and 15.8 g of a vinyl chloride resin (MR-555, produced by Nippon Zeon Corporation) in a mixed solvent of 0.25 g of acetylacetone, 0.25 g of n-butyl stearate, and 97.9 mL of cyclohexane) is collected in an amount of 1.11 mL with a micropipette and added to the stainless steel pot. Immediately thereafter, 30 g of steel balls (diameter: 2 mm) and 10 pieces of nylon ball (diameter: 8 mm) are added to the pot, and after closing the lid, the pot is allowed to stand for 10 minutes. Thereafter, the pot is mounted on a centrifugal ball mill (Fritsch P-6), the rotation number of which is gradually increased to 600 rpm, and the dispersion treatment is performed for 60 minutes. After the centrifugal ball mill is stopped, the pot is taken out therefrom, to which 0.70 mL of a conditioning liquid, which is a mixture of MEK and toluene having been mixed in advance at a ratio of 1/1, is added thereto with a micropipette. The pot is again mounted on the centrifugal ball mill, and subjected to a dispersion treatment at 600 rpm for 5 minutes, so as to prepare a coating material.

Formation of Magnetic Sheet

After completing the dispersion shown above, the lid of the pot is opened, the nylon balls are removed, and the coating material thus prepared is placed in an applicator (distance: 250 μm) along with the steel balls, and coated on a supporting film (a polyethylene film, Lumirror, a trade name, produced by Toray Industries, Inc.). Immediately after coating, the coated film is subjected to magnetic field orientation by quickly placing at the center of the coil of the orientation device with a magnetic flux density of 0.55 T, and then dried by allowing to stand.

Measurement of Magnetic Hysteresis Curve (Sheet B-H Curve)

A plastic plate is adhered to the film for enabling the discrimination of the magnetic field orientation direction thereof, and the assembly is cut with a punch or the like to form a measurement piece having a 10 mm square, which is mounted with the orientation direction aligned with the direction of the applied magnetic field, and measured for the coercive force Hcx (Oe, kA/m), the coercive force distribution SFDx in the direction in parallel to the surface of the magnetic layer, the maximum energy product BHmax, the saturation magnetic flux density Bs (Gauss), and the residual magnetic flux density Br (Gauss) at an external magnetic field of 795.8 kA/m (10 kOe), and the value of SQx (=Br/Bs) in the orientation direction of the magnetic field is obtained, with a VSM machine (VSM-P7), produced by Toei Industry Co., Ltd.

When the iron-based oxide magnetic particle powder of the invention is formed into a coating material and a medium, the coercive force Hcx is increased, and the value SFD is decreased, both of which are improved. A magnetic sheet (magnetic recording medium) showing excellent characteristics for BHmax and SQx as the characteristics of the medium can be obtained.

EXAMPLE

Example 1

To 3,015.92 g of pure water in a 5 L reaction vessel, 292.50 g of ferric(III) nitrate nonahydrate having a purity of 99%, 77.87 g of a Ga(III) nitrate solution having a Ga concentration of 10.4% by mass, 6.58 g of cobalt(II) nitrate hexahydrate having a purity of 97%, and 7.14 g of titanium (IV) sulfate having a Ti concentration of 14.7% by mass were dissolved by mechanically stirring with a stirring blade in the air atmosphere. The charged solution had a molar ratio of metal ions of Fe/Ga/Co/Ti=1.635/0.265/0.050/0.050. The numeral in parentheses following the compound name shows the valence of the metal element.

In the air atmosphere, to the charged solution, 161.34 g of an ammonia solution of 21.85% by mass was added at once under mechanically stirring with a stirring blade under a condition of 20° C., followed by continuously stirring for 2 hours. The turbid brown solution in the initial stage of addition was changed to a transparent brown reaction solution after 2 hours, and the pH thereof was 2.06.

Subsequently, 168.44 g of a citric acid solution having a citric acid concentration of 10% by mass was continuously added under a condition of 20° C. over 1 hour, then 200 g of an ammonia solution of 10% by mass was added at once to make pH 8.9, and then the solution was retained under a condition of a temperature of 20° C. for 1 hour under stirring, so as to form crystals of iron oxyhydroxide containing substituting elements as a precursor as an intermediate (procedure 1).

In the first and second neutralization steps, the temperature of the reaction solution was temporarily increased near 25° C. due to the neutralization heat, but was returned to 20° C. by forcedly cooling within 60 minutes.

FIG. 1 shows the X-ray diffraction pattern of the iron oxyhydroxide crystals containing substituting elements obtained in this example. The X-ray diffraction pattern shows that the iron oxyhydroxide has a ferrihydrite structure.

The slurry obtained in the procedure 1 was recovered, and rinsed with an ultrafiltration membrane with an UF cut-off molecular weight of 50,000 until the filtrate showed an electroconductivity of 3.8 mS/m or less (procedure 2).

1,090.00 g of the rinsed slurry liquid obtained in the procedure 2 (containing 16.8 g of ε-$Fe_2O_3$ (partially substituted material)) was collected to a 5 L reaction vessel, and after adding pure water thereto to make a liquid amount of 4,000 mL, ammonia was added in an amount of 0.8% by mass based on ε-$Fe_2O_3$, and tetraethoxysilane was added in an amount of 7.0% by mass based on ε-$Fe_2O_3$, in the air at 30° C. under stirring. Actually, 59.80 g of an ammonia solution of 21.45% by mass was added, and then 117.23 g of tetraethoxysilane was added to the slurry liquid over 35 minutes. The slurry liquid was continuously stirred for 20 hours, and thereby the silanol derivative formed through hydrolysis was coated. Thereafter, a solution obtained by dissolving 181.0 g of ammonium sulfate in 300 g of water was added, and the resulting solution was rinsed and subjected to solid-liquid separation to form a cake, which was recovered (procedure 3).

The precipitate obtained in the procedure 3 (the precursor coated with $SiO_2$ in the form of gel) was dried, and the dried powder was subjected to a heat treatment in a furnace with an air atmosphere at 1,065° C. for 4 hours, so as to provide iron-based oxide magnetic particle powder coated with a silicon oxide. The silanol derivative is changed to an oxide in the heat treatment in an air atmosphere (procedure 4).

The heat-treated powder obtained in the procedure 4 was stirred in an NaOH aqueous solution of 20% by mass at approximately 70° C. for 24 hours, so as to remove the silicon oxide on the surface of the particles. Subsequently, the powder was rinsed with a centrifugal separator until the conductivity reached 15 mS/m or less, and the powder was filtered with a membrane filter, followed by drying, and subjected to the chemical analysis of the composition, the XRD measurement, the TEM observation, the measurement of the magnetic characteristics, and the like.

Figure 2:
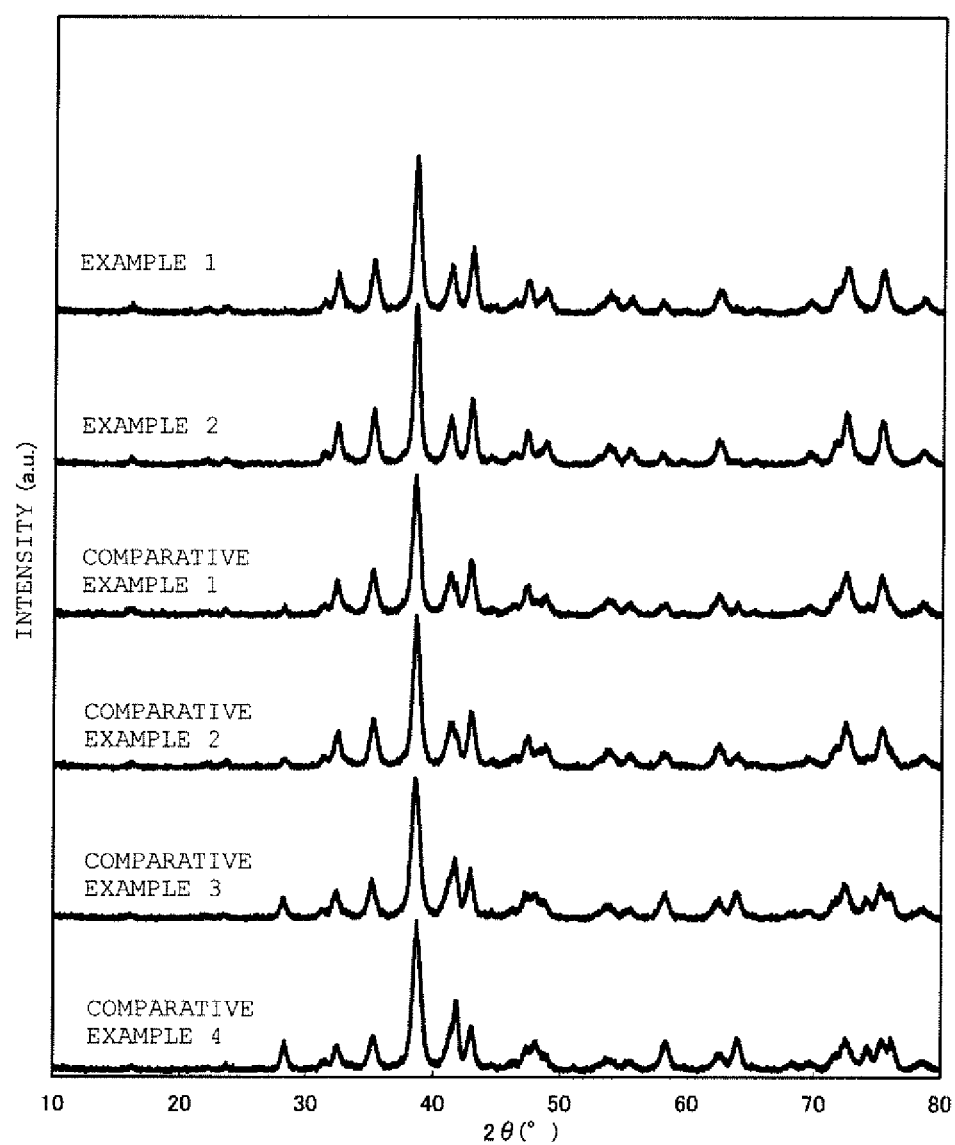
FIG. 2 shows the X-ray diffraction patterns of the iron-based oxide magnetic particle powder obtained in Examples 1 and 2 and Comparative Examples 1 to 4.
Figure 3:
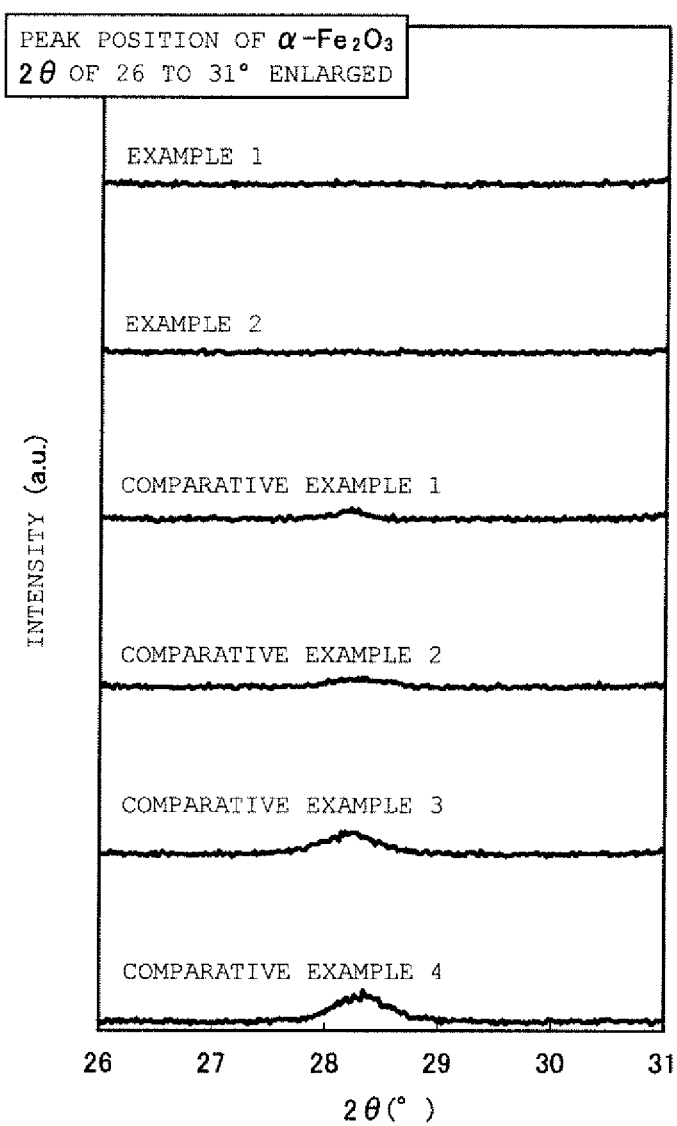
FIG. 3 is an enlarged view of FIG. 2 around the diffraction angle of 28°.
Figure 4:
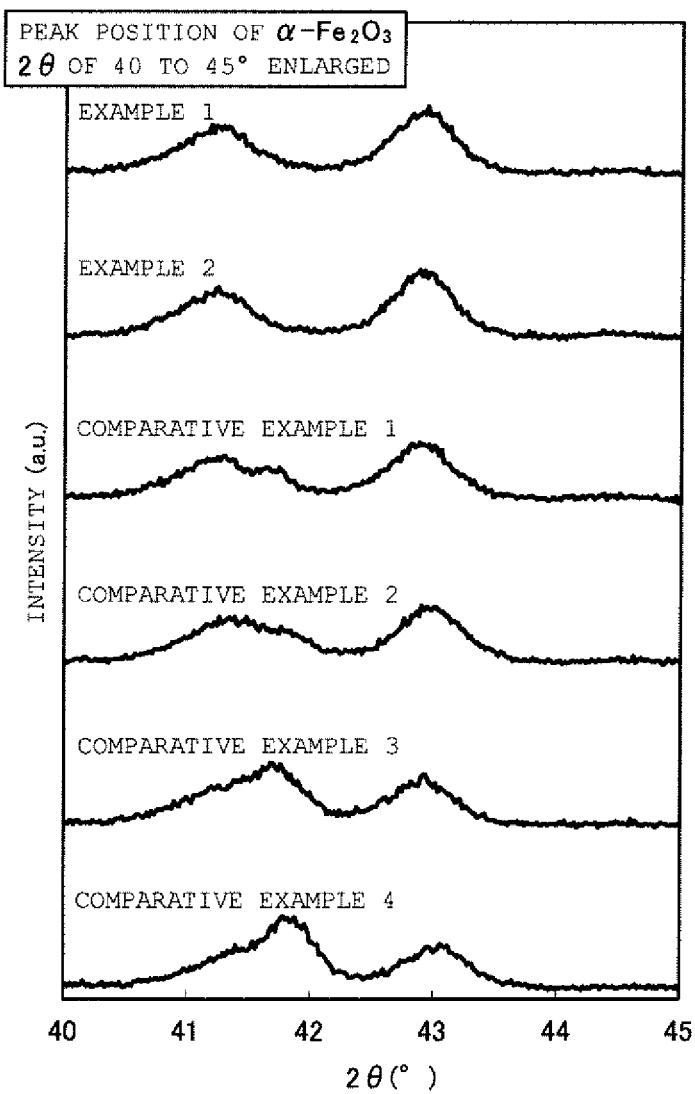
FIG. 4 is an enlarged view of FIG. 2 around the diffraction angle of 42°.

The chemical composition of the resulting iron-based oxide magnetic particle powder was the substantially same as the charged composition. FIG. 2 shows the result of the XRD measurement of the resulting iron-based oxide magnetic particle powder, FIG. 3 shows an enlarged view thereof around the diffraction angle of 28°, and FIG. 4 shows an enlarged view thereof around the diffraction angle of 42°. The peak appearing around the diffraction angle of 28° is the diffraction peak of $\alpha$-$Fe_2O_3$ solely, and the peak appearing around the diffraction angle of 43° is the diffraction peak of $\varepsilon$-$Fe_2O_3$ solely. The resulting iron-based oxide magnetic particle powder showed the substantially same crystal structure as $\varepsilon$-$Fe_2O_3$, and substantially no peak of $\alpha$-$Fe_2O_3$ was observed around the diffraction angle of 28° (FIG. 3). The measurement results means that the most of the iron-based oxide magnetic particle powder obtained by the production method of the invention is magnetic particles of an iron-based oxide of $\varepsilon$-$Fe_2O_3$, a part of Fe sites of which is substituted by another metal element.

Figure 5:
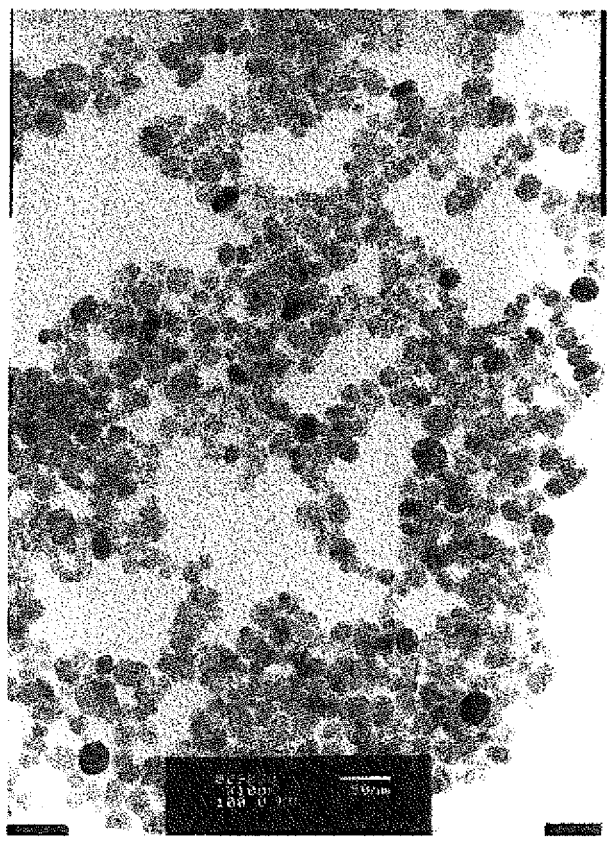
FIG. 5 shows the TEM micrograph of the iron-based oxide magnetic particle powder obtained in Example 1.

FIG. 5 shows the TEM micrograph of the iron-based oxide magnetic particle powder obtained in this example, and the measurement results of the charge ratios of the metal ions and the measurement results including the average particle diameter, and the like are shown in Table 1. The length of the white bar shown on the left side of the TEM micrograph shows 50 nm (which is the same as in the other TEM micrographs below).

Figure 6A:
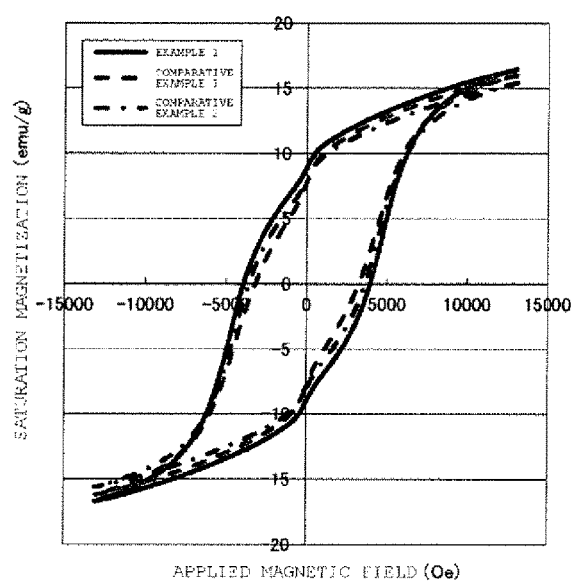
FIG. 6 shows (a) the B-H curves and (b) the differential B-H curves of the iron-based oxide magnetic particle powder obtained in Example 1, Comparative Example 1, and Comparative Example 2.
Figure 6B:
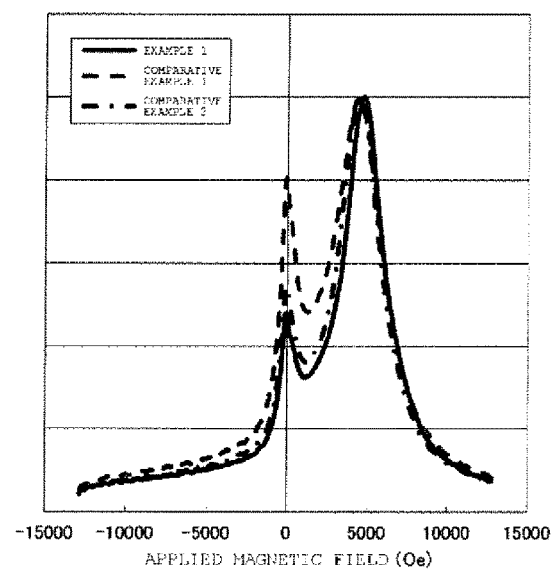

FIG. 6 shows (a) the B-H curves and (b) the differential B-H curves of the iron-based oxide magnetic particle powder obtained in this example, and the measurement results including the coercive force, and the like are shown in Table 1. FIG. 6(b) is normalized to make the peaks on the high Hc side to have the same height, and the ordinate (dB/dH) is an arbitrary intensity.

The iron-based oxide magnetic particle powder obtained in this example had an average particle diameter of 17.5 nm, a coefficient of variation (CV value) of 40.5%, and a number of particles having a particle diameter of 8 nm or less (%) of 6.9%. The differential B-H curve had two clear peaks observed, the value of $I_L/I_H$ was 0.47, SFD obtained from the half bandwidth of the peak of the high Hc component was 0.86, the value of $\alpha_s/\varepsilon_s$ obtained by XRD was 0.06. All the values were superior to those of the iron-based oxide magnetic particle powder obtained in Comparative Examples 1 to 4 described later.

Example 2

Iron-based oxide magnetic particle powder was obtained under the same condition as in Example 1 except that the reaction temperature between the first neutralization step and the second neutralization step was 10° C. In this example, the temperature increase of approximately 5° C. occurred in the initial stage of the neutralization step, but the temperature was returned to 10° C. within 40 minutes.

The resulting iron-based oxide magnetic particle powder had a value of $I_L/I_H$ of 0.37, SFD of 0.67, and a value of $\alpha_s/\varepsilon_s$ of 0.06. The XRD measurement results are shown in FIGS. 2 to 4, and the measurement results including the average particle diameter, and the like are shown in Table 1.

Examples 3 and 4

For Example 3, iron-based oxide magnetic particle powder was obtained in the same procedure as in Example 1 except that Fe was added in the form of iron(III) chloride hexahydrate, Co was added in the form of cobalt(II) chloride hexahydrate, and Ti was added in the form of a solution of titanium(IV) chloride, and for Example 4, iron-based oxide magnetic particle powder was obtained in the same procedure as in Example 2 except that Fe was added in the form of iron(III) chloride hexahydrate, Co was added in the form of cobalt(II) chloride hexahydrate, and Ti was added in the form of a solution of titanium(IV) chloride.

Figure 7:
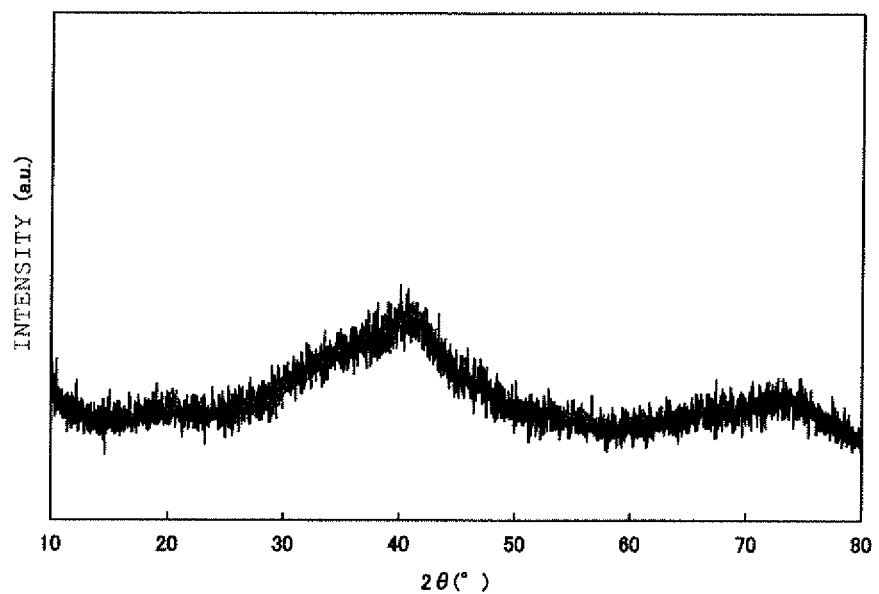
FIG. 7 shows the X-ray diffraction pattern of the iron oxyhydroxide crystals containing substituting elements obtained in Example 3.
Figure 8:
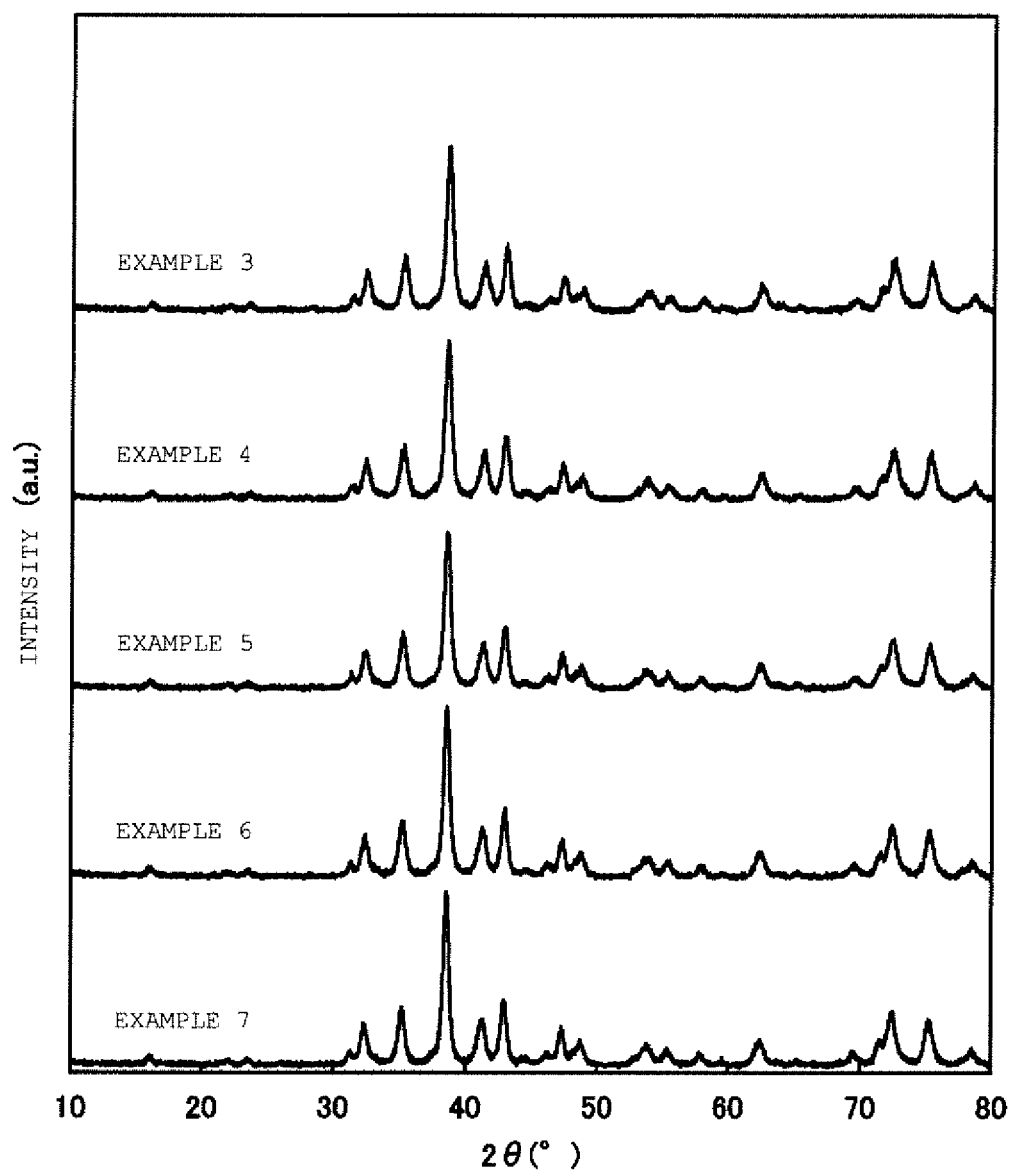
FIG. 8 shows the X-ray diffraction patterns of the iron-based oxide magnetic particle powder obtained in Examples 3 to 7.
Figure 9:
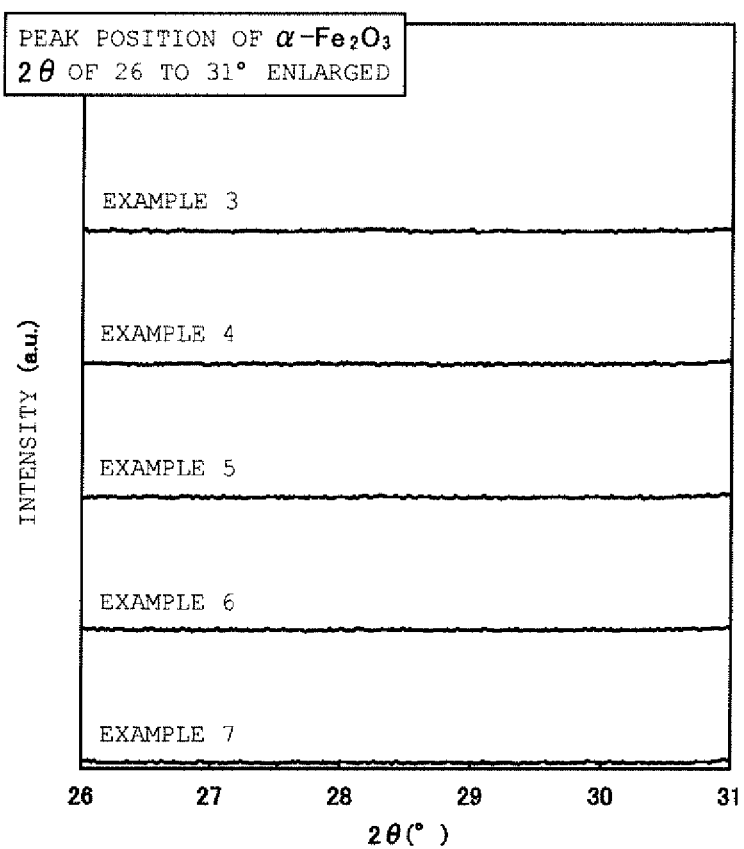
FIG. 9 is an enlarged view of FIG. 8 around the diffraction angle of 28°.
Figure 10:
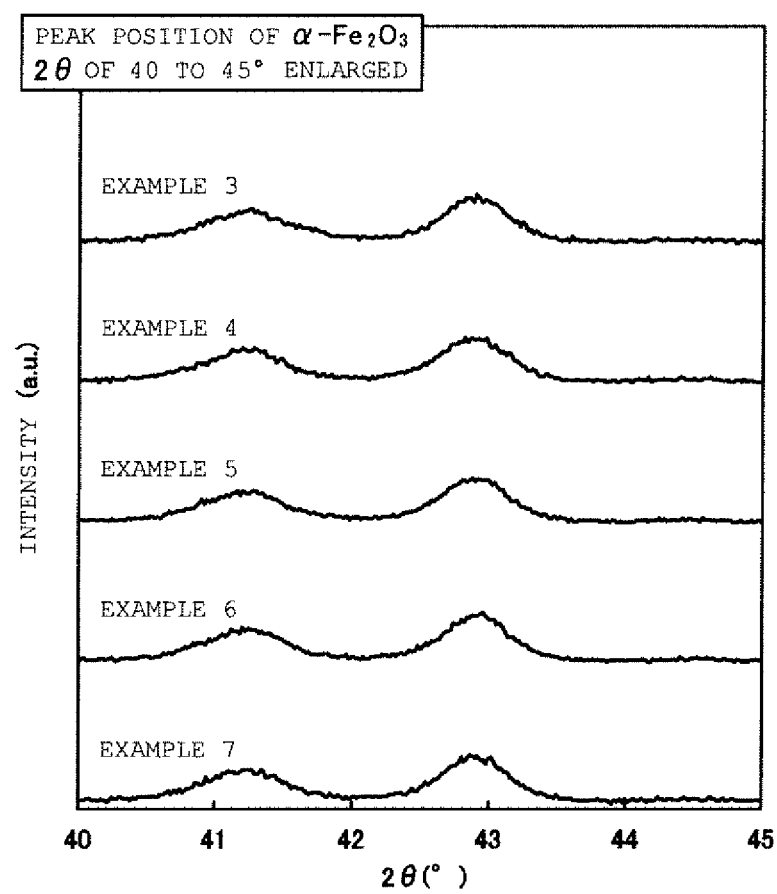
FIG. 10 is an enlarged view of FIG. 8 around the diffraction angle of 42°.
Figure 11:
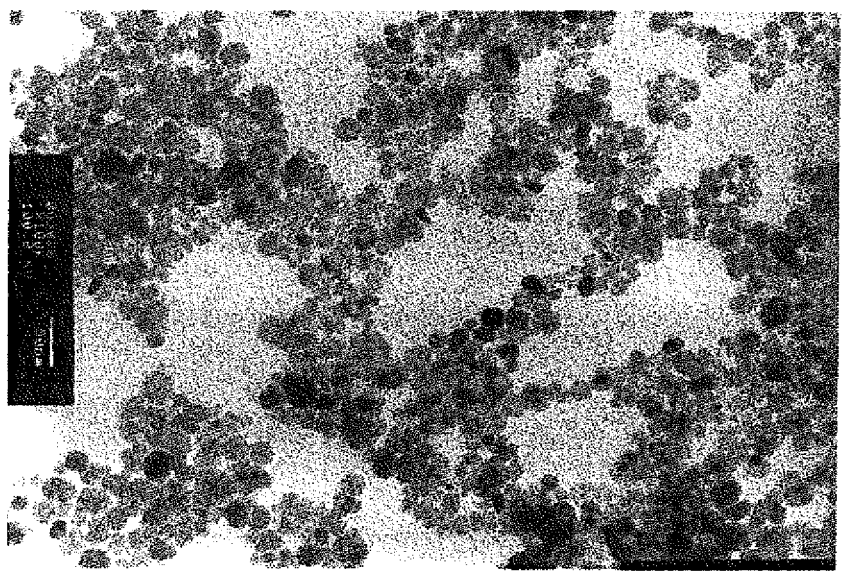
FIG. 11 shows the TEM micrograph of the iron-based oxide magnetic particle powder obtained in Example 3.
Figure 12A:
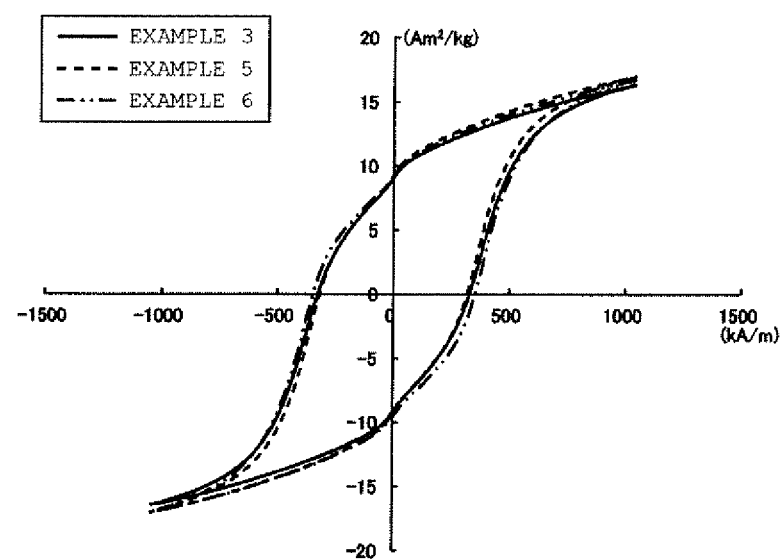
FIG. 12 shows (a) the B-H curves and (b) the differential B-H curves of the iron-based oxide magnetic particle powder obtained in Example 3, Example 5, and Example 6.
Figure 12B:
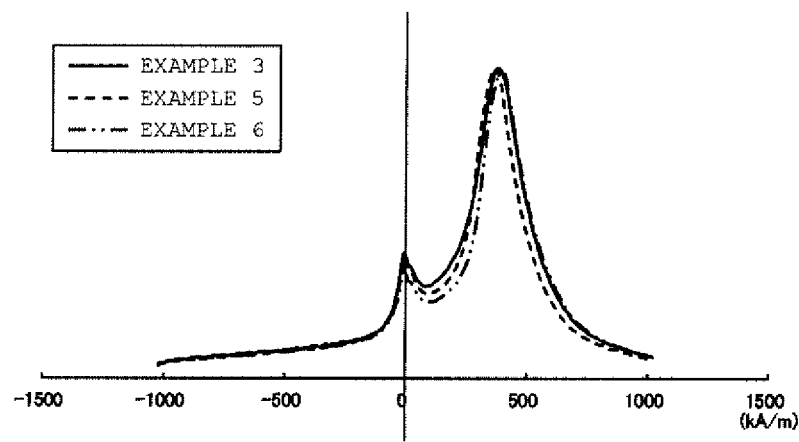

FIG. 7 shows the X-ray diffraction pattern of the iron oxyhydroxide crystals containing substituting elements obtained in Example 3, and FIG. 8 shows the X-ray diffraction patterns of the iron-based oxide magnetic particle powder obtained in Examples 3 and 4 and Examples 5 to 7 described later. FIG. 9 is an enlarged view of FIG. 8 around the diffraction angle of 28°, and FIG. 10 is an enlarged view of FIG. 8 around the diffraction angle of 42°. FIG. 11 shows the TEM micrograph of the iron-based oxide magnetic particle powder obtained in Example 3. FIG. 12 shows (a) the B-H curves and (b) the differential B-H curves of the iron-based oxide magnetic particle powder obtained in Example 3 and Examples 5 and 6 described later. The precursors formed in Examples 3 and 4 contained $\beta$-FeOOH partially in the ferrihydrite phase.

The resulting iron-based oxide magnetic particle powder had a value of $I_L/I_H$ of 0.40 for Example 3 and 0.43 for Example 4, SFD of 0.81 for Example 3 and 0.79 for Example 4, and a value of $\alpha_s/\varepsilon_s$ of 0.07 for Example 3 and 0.06 for Example 4. The measurement results including the average particle diameter, and the like are shown in Table 1.

Comparative Example 1

This comparative example is the production method described in PTL 3 performed at a reaction temperature of 20° C.

To 3,079.87 g of pure water in a 5 L reaction vessel, 547.77 g of ferric(III) nitrate nonahydrate having a purity of 99.5%, 145.17 g of a Ga(III) nitrate solution having a Ga concentration of 10.5% by mass, 12.38 g of cobalt (III) nitrate hexahydrate having a purity of 97%, and 13.44 g of titanium(IV) sulfate having a Ti concentration of 14.7% by mass were dissolved by mechanically stirring with a stirring blade in the air atmosphere. The charged solution had a molar ratio of metal ions of Fe/Ga/Co/Ti=1.635/0.265/0.050/0.050.

In the air atmosphere, to the charged solution, 463.81 g of an ammonia solution of 22.22% by mass was added at once under mechanically stirring with a stirring blade under a condition of 20° C., followed by continuously stirring for 0.5 hour, so as to form crystals of iron oxyhydroxide containing substituting elements as a precursor as an intermediate (procedure 1). The pH after stirring for 0.5 hour was 9.

Thereafter, the resulting intermediate was rinsed with water, and then subjected to the treatments in the procedures 3 and later in Example 1, and the iron-based oxide magnetic particle powder obtained in Comparative Example 1 was subjected to the chemical analysis of the composition, the XRD measurement, the TEM observation, the measurement of the magnetic characteristics, and the like. The measurement results are shown in FIGS. 2 to 4 and Table 1, and the B-H curve and the differential B-H curve obtained in Comparative Example 1 are shown in FIG. 6.

The resulting iron-based oxide magnetic particle powder had a value of $I_L/I_H$ of 0.79 and a value of $\alpha_s/\varepsilon_s$ of 0.19, which were inferior to those of Example 1.

Comparative Examples 2 to 4

Iron-based oxide magnetic particle powder was obtained under the same condition as in Example 1 except that the reaction temperature between the first neutralization step and the second neutralization step was 40° C. for Comparative Example 2, 60° C. for Comparative Example 3, and 80° C. for Comparative Example 4. The measurement results of the resulting iron-based oxide magnetic particle powder are shown in FIGS. 2 to 4 and Table 1.

The resulting iron-based oxide magnetic particle powder had a value of $I_L/I_H$ of 0.54 for Comparative Example 2, 0.69 for Comparative Example 3, and 0.70 for Comparative Example 4, which were favorable values, but had a value of $\alpha_s/\varepsilon_s$ of 0.17 for Comparative Example 2, 0.46 for Comparative Example 3, and 0.70 for Comparative Example 4, which showed that the content of $\alpha$-$Fe_2O_3$ was increased with the increase of the reaction temperature.

Examples 5 to 7

Slurries containing the precursor after the water rinsing obtained in the same condition as in Example 1 for Example 5, as in Example 3 for Example 6, and as in Example 4 for Example 7 each were subjected to a hydrothermal treatment at a temperature of 160° C. for 6 hours with an autoclave. The solvent used herein was pure water.

Figure 13:
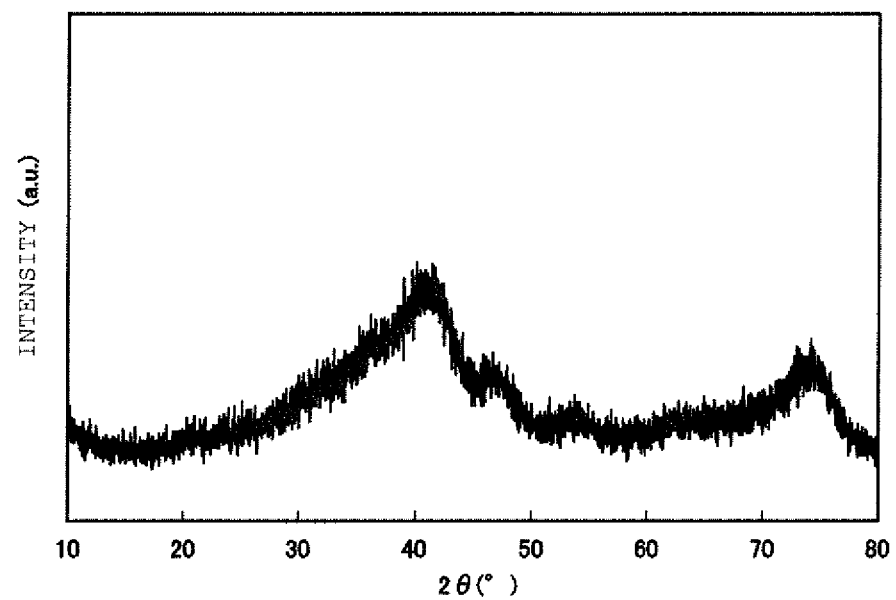
FIG. 13 shows the X-ray diffraction pattern of the iron oxyhydroxide crystals containing substituting elements after subjecting to the hydrothermal treatment in Example 5.

FIG. 13 shows the X-ray diffraction pattern of the iron oxyhydroxide crystals containing substituting elements after subjecting to the hydrothermal treatment in Example 5. The diffraction peak in FIG. 13 was sharper than in FIG. 1, and it was understood that the crystallinity of the precursor was enhanced by the hydrothermal treatment. The peak of ferrihydrite having the 6L structure difficult to become the $\varepsilon$-type iron-based oxide as compared to the 2L structure was slightly found, but no formation of a heterogeneous phase was found, providing no problem.

Figure 14:
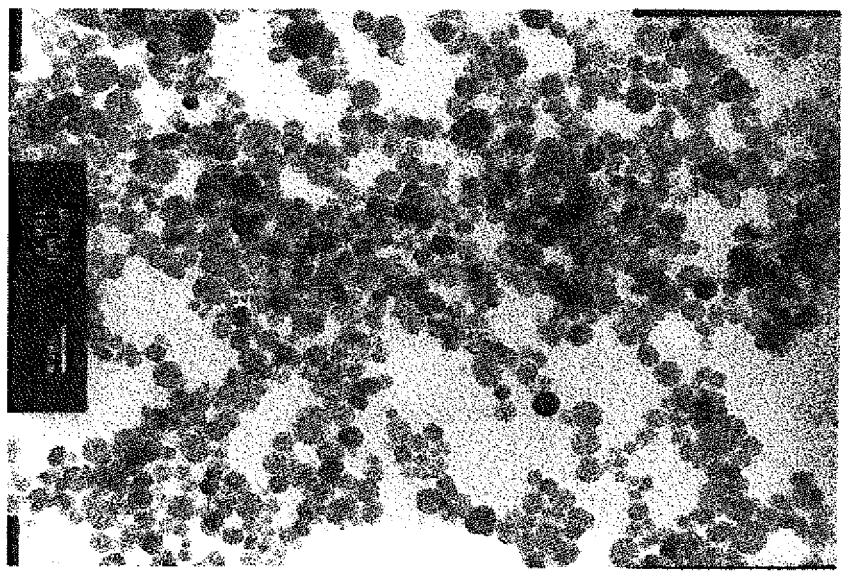
FIG. 14 shows the TEM micrograph of the iron-based oxide magnetic particle powder obtained in Example 5.
Figure 15:
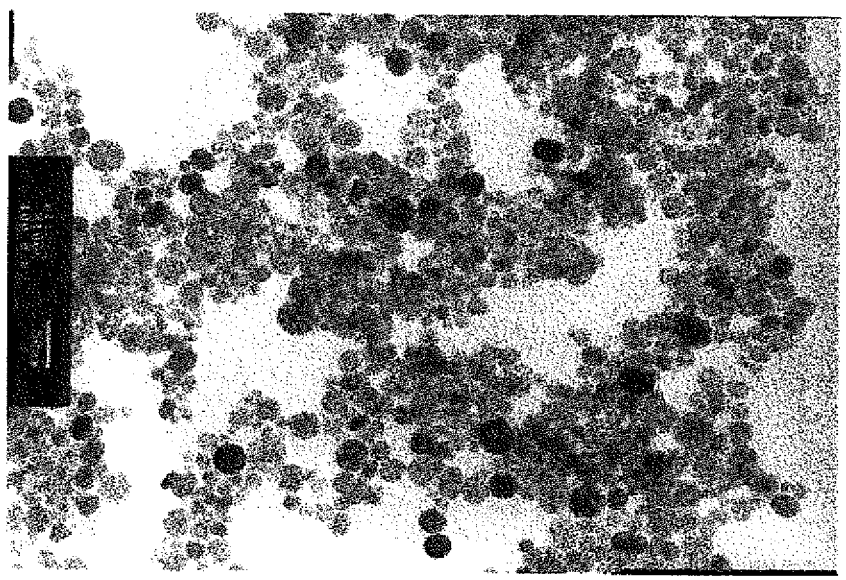
FIG. 15 shows the TEM micrograph of the iron-based oxide magnetic particle powder obtained in Example 6.

FIGS. 8, 9, and 10 show the X-ray diffraction patterns of the iron-based oxide magnetic particle powder obtained in Examples 5, 6 and 7. FIG. 14 shows the TEM micrograph of the iron-based oxide magnetic particle powder obtained in Example 5, and FIG. 15 shows the TEM micrograph of the iron-based oxide magnetic particle powder obtained in Example 6.

The measurement results including the average particle diameter, and the like of the iron-based oxide magnetic particle powder obtained in Examples 5 to 7 are shown in Table 1. It is understood from the results of the examples that the hydrothermal treatment performed decreases and improves the value of $I_L/I_H$ and SFD.

Magnetic tapes were produced according to the aforementioned procedure by using the iron-based oxide magnetic particle powder obtained in Example 1, Example 5, and Comparative Example 1, and the tapes were measured for the magnetic characteristics. The dispersion time in the production of the tape was 60 minutes, and the tape was dried in the magnetic field for orientation of 5.5 kOe (438 kA/m). The measurement results are shown in Table 2.

When the iron-based oxide magnetic particle powder was formed into a coating material and a medium, the coercive force Hcx was increased, and the value SFD was decreased, both of which were improved. Furthermore, excellent characteristics as compared to Comparative Example 1 were obtained for the magnetic sheet characteristics, the coercive force Hcx, SFDx, BHmax, and SQx, from which it was understood that the increase of the recording density of the magnetic recording medium was enabled.

TABLE 1

| | | Example 1 | Example 2 | Example 3 | Example 4 | Comparative Example 1 | Comparative Example 2 | Comparative Example 3 | Comparative Example 4 | Example 5 | Example 6 | Example 7 |
|---|---|---|---|---|---|---|---|---|---|---|---|---|
| Charged ratio | Fe | 1.635 | 1.635 | 1.635 | 1.635 | 1.635 | 1.635 | 1.635 | 1.635 | 1.635 | 1.635 | 1.635 |
| | Ga | 0.265 | 0.265 | 0.265 | 0.265 | 0.265 | 0.265 | 0.265 | 0.265 | 0.265 | 0.265 | 0.265 |
| | Co | 0.050 | 0.050 | 0.050 | 0.050 | 0.050 | 0.050 | 0.050 | 0.050 | 0.050 | 0.050 | 0.050 |
| | Ti | 0.050 | 0.050 | 0.050 | 0.050 | 0.050 | 0.050 | 0.050 | 0.050 | 0.050 | 0.050 | 0.050 |
| TEM average particle diameter (nm) | | 17.5 | 18.4 | 17.6 | 17.4 | 16.0 | 16.8 | 16.9 | 17.5 | 18.2 | 18.0 | 17.4 |
| Coefficient of variation of average particle diameter (%) | | 40.5 | 40.7 | 40.9 | 40.6 | 43.0 | 43.0 | 41.7 | 44.6 | 42.0 | 41.2 | 43.0 |
| Number of particles having particle diameter of 8 nm or less (%) | | 6.9 | 4.4 | 5.5 | 5.6 | 8.9 | 9.5 | 6.8 | 9.2 | 6.7 | 7.5 | 8.6 |
| Coercive force Hc (kA/m) | | 314.1 | 338.2 | 327.3 | 352.4 | 256.8 | 288.2 | 241.2 | 248.3 | 317.7 | 349.2 | 354.4 |

TABLE 1-continued

|  | Example 1 | Example 2 | Example 3 | Example 4 | Comparative Example 1 | Comparative Example 2 | Comparative Example 3 | Comparative Example 4 | Example 5 | Example 6 | Example 7 |
|---|---|---|---|---|---|---|---|---|---|---|---|
| Coercive force Hc (Oe) | 3947 | 4250 | 4113 | 4429 | 3227 | 3621 | 3031 | 3120 | 3992 | 4388 | 4454 |
| Saturation magnetization σs (Am²/kg) | 16.6 | 17.5 | 16.3 | 16.8 | 16.1 | 15.5 | 12.5 | 11.1 | 16.9 | 16.8 | 16.8 |
| $I_L/I_H$ | 0.47 | 0.37 | 0.40 | 0.43 | 0.79 | 0.54 | 0.69 | 0.70 | 0.38 | 0.34 | 0.34 |
| SFD | 0.86 | 0.67 | 0.81 | 0.79 | 1.68 | 0.97 | 1.68 | 1.45 | 0.71 | 0.67 | 0.67 |
| αS/εS | 0.06 | 0.06 | 0.07 | 0.06 | 0.19 | 0.17 | 0.46 | 0.70 | 0.06 | 0.05 | 0.05 |

TABLE 2

Dispersion time: 60 minutes

Tape characteristics (VSM 10 kOe)

|  | Hcx (Oe) | Hcx (kA/m) | SFDx | BHmax | SQx |
|---|---|---|---|---|---|
| Example 1 | 4208 | 334.9 | 0.76 | 0.35 | 0.75 |
| Example 5 | 4211 | 335.1 | 0.66 | 0.37 | 0.77 |
| Comparative Example 1 | 3523 | 280.4 | 1.14 | 0.29 | 0.68 |

The invention claimed is:

1. An iron-based oxide magnetic particle powder comprising ε-$Fe_2O_3$ having an average particle diameter measured with a transmission electron microscope of 10 nm or more and 30 nm or less, a part of Fe sites of which is substituted by another metal element, the iron-based oxide magnetic particle powder having a value of $I_L/I_H$ defined below of 0.7 or less and a value of $\alpha_s/\varepsilon_s$ defined below of 0.1 or less, wherein $I_H$ represents an intensity of a peak present on a high magnetic field side in a differential B-H curve obtained by numerical differential of a B-H curve obtained by measuring under conditions of an applied magnetic field of 1,035 kA/m (13 kOe), an M measurement range of 0.005 A·m² (5 emu), a step bit of 80 bit, a time constant of 0.03 sec, and a wait time of 0.1 sec; and $I_L$ represents an intensity of an intercept of an ordinate at zero magnetic field in the differential B-H curve, and $\alpha_s$ represents a maximum value of a diffraction intensity except for background in X-ray diffractometry at 2θ of 27.2° or more and 29.7° or less; and $\varepsilon_s$ represents a maximum value of a diffraction intensity except for background in X-ray diffractometry at 2θ of 42° or more and 44° or less.

2. The iron-based oxide magnetic particle powder according to claim 1, wherein the iron-based oxide is ε-$A_xB_yC_zFe_{2-x-y-z}O_3$ (wherein A represents at least one divalent metal element selected from Co, Ni, Mn, and Zn; B represents at least one tetravalent metal atom selected from Ti and Sn; C represents at least one trivalent metal element selected from In, Ga, and Al; and 0<x, y, z<1).

3. A method for producing iron-based oxide magnetic particle powder comprising ε-$Fe_2O_3$ having an average particle diameter measured with a transmission electron microscope of 10 nm or more and 30 nm or less, a part of Fe sites of which is substituted by another metal element, the method comprising:

a first neutralization step of neutralizing an aqueous solution containing a trivalent iron ion and an ion of the metal substituting a part of the Fe sites to make pH of 1.5 or more and 2.5 or less at a temperature retained at 5° C. or more and 25° C. or less;

adding a hydroxycarboxylic acid to the aqueous solution after neutralizing, at a temperature retained at 5° C. or more and 25° C. or less;

a second neutralization step of neutralizing the aqueous solution to make pH of 8.0 or more and 9.0 or less at a temperature retained at 5° C. or more and 25° C. or less after adding the hydroxycarboxylic acid;

rinsing a formed precipitate of iron oxyhydroxide containing the substituting metal element formed in the second neutralization step, with water;

coating a silicon oxide on the iron oxyhydroxide containing the substituting metal element after rinsing with water; and heating the iron oxyhydroxide containing the substituting metal element coated with the silicon oxide to provide an iron oxide containing the substituting metal element coated with the silicon oxide.

4. The method for producing iron-based oxide magnetic particle powder according to claim 3, wherein the method further comprises:

removing the silicon oxide coated on the iron oxide containing the substituting metal element, after providing the iron oxide containing the substituting metal element coated with the silicon oxide.

5. The method for producing iron-based oxide magnetic particle powder according to claim 3, wherein the iron-based oxide magnetic particle powder has a value of $I_L/I_H$ defined below of 0.7 or less and a value of $\alpha_s/\varepsilon_s$ defined below of 0.1 or less, wherein $I_H$ represents an intensity of a peak present on a high magnetic field side in a differential B-H curve obtained by numerical differential of a B-H curve obtained by measuring under conditions of an applied magnetic field of 1,035 kA/m (13 kOe), an M measurement range of 0.005 A·m² (5 emu), a step bit of 80 bit, a time constant of 0.03 sec, and a wait time of 0.1 sec; and $I_L$ represents an intensity of an intercept of an ordinate at zero magnetic field in the differential B-H curve, and $\alpha_s$ represents a maximum value of a diffraction intensity except for background in X-ray diffractometry at 2θ of 27.2° or more and 29.7° or less; and $\varepsilon_s$ represents a maximum value of a diffraction intensity except for background in X-ray diffractometry at 2θ of 42° or more and 44° or less.

6. The method for producing iron-based oxide magnetic particle powder according to claim 3, wherein the iron-based oxide is ε-$A_xB_yC_zFe_{2-x-y-z}O_3$ (wherein A represents at least one divalent metal element selected from Co, Ni, Mn, and Zn; B represents at least one tetravalent metal atom selected from Ti and Sn; C represents at least one trivalent metal element selected from In, Ga, and Al; and 0<x, y, z<1).

7. The method for producing iron-based oxide magnetic particle powder according to claim 3, wherein the hydroxycarboxylic acid is at least one selected from tartaric acid, citric acid, and malic acid.

8. A method for producing iron-based oxide magnetic particle powder comprising $\varepsilon$-$Fe_2O_3$ having an average particle diameter measured with a transmission electron microscope of 10 nm or more and 30 nm or less, a part of Fe sites of which is substituted by another metal element, the method comprising:
- a first neutralization step of neutralizing an aqueous solution containing a trivalent iron ion and an ion of the metal substituting a part of the Fe sites to make pH of 1.5 or more and 2.5 or less at a temperature retained at 5° C. or more and 25° C. or less;
- adding a hydroxycarboxylic acid to the aqueous solution after neutralizing, at a temperature retained at 5° C. or more and 25° C. or less;
- a second neutralization step of neutralizing the aqueous solution to make pH of 8.0 or more and 9.0 or less at a temperature retained at 5° C. or more and 25° C. or less after adding the hydroxycarboxylic acid;
- rinsing a formed precipitate of iron oxyhydroxide containing the substituting metal element formed in the second neutralization step, with water;
- subjecting the iron oxyhydroxide containing the substituting metal element after rinsing with water, to a hydrothermal treatment at 120° C. or more and 180° C. or less;
- coating a silicon oxide on the iron oxyhydroxide containing the substituting metal element after subjecting to the hydrothermal treatment; and
- heating the iron oxyhydroxide containing the substituting metal element coated with the silicon oxide to provide an iron oxide containing the substituting metal element coated with the silicon oxide.

9. The method for producing iron-based oxide magnetic particle powder according to claim 8, wherein the method further comprises:
removing the silicon oxide coated on the iron oxide containing the substituting metal element,
after providing the iron oxide containing the substituting metal element coated with the silicon oxide.

10. Iron-based oxide magnetic particle powder produced by the method for producing iron-based oxide magnetic particle powder according to claim 3.

11. A coating material for a coating type magnetic recording medium, comprising the iron-based oxide magnetic particle powder according to claim 1.

12. A magnetic recording medium comprising the iron-based oxide magnetic particle powder according to claim 1.

* * * * *